United States Patent
Naruse et al.

(10) Patent No.: US 9,892,492 B2
(45) Date of Patent: *Feb. 13, 2018

(54) IMAGE PROCESSING DEVICE, IMAGING APPARATUS, PARAMETER GENERATING METHOD, IMAGE PROCESSING METHOD, AND NON-TRANSITORY COMPUTER READABLE RECORDING MEDIUM STORING A PROGRAM

(71) Applicant: FUJIFILM Corporation, Tokyo (JP)

(72) Inventors: Yousuke Naruse, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/135,737

(22) Filed: Apr. 22, 2016

(65) Prior Publication Data

US 2016/0239946 A1    Aug. 18, 2016

Related U.S. Application Data

(63) Continuation of application No. PCT/JP2014/075727, filed on Sep. 26, 2014.

(30) Foreign Application Priority Data

Oct. 31, 2013  (JP) ................... 2013-227389

(51) Int. Cl.
G06K 9/40 (2006.01)
G06T 5/00 (2006.01)
(Continued)

(52) U.S. Cl.
CPC ............... *G06T 5/003* (2013.01); *G06T 5/10* (2013.01); *H04N 1/4092* (2013.01);
(Continued)

(58) Field of Classification Search
CPC .. G06T 5/003; G06T 5/10; G06T 5/20; G06T 2207/10004; G06T 2207/20024;
(Continued)

(56) References Cited

U.S. PATENT DOCUMENTS

| | | |
|---|---|---|
| 7,574,122 B2 | 8/2009 | Fukumoto et al. |
| 8,798,389 B2 | 8/2014 | Hatakeyama |

(Continued)

FOREIGN PATENT DOCUMENTS

| | | |
|---|---|---|
| JP | 2006-129236 A | 5/2006 |
| JP | 2006-333061 A | 12/2006 |

(Continued)

OTHER PUBLICATIONS

Extended European Search Report, dated Aug. 2, 2016, for European Application No. 14857203.5.

(Continued)

*Primary Examiner* — Amir Alavi
(74) *Attorney, Agent, or Firm* — Birch, Stewart, Kolasch & Birch, LLP

(57) ABSTRACT

A restoration processing section 38 performs restoration processing using a restoration filter based on a point spread function for image data. An outline enhancement processing section 39 performs sharpening processing using a sharpening filter for image data. A sharpness restoration control section 37 acquires a total sharpness restoration rate based on the restoration rate (restoration strength magnification U) of the image data based on the restoration processing and the sharpening rate (sharpening strength magnification V) of the image data based on the sharpening processing, acquires one of the restoration rate and the sharpening rate, and calculates the other one of the restoration rate and the sharpening rate based on the total sharpness restoration rate.

35 Claims, 13 Drawing Sheets

(51) Int. Cl.
   *H04N 5/357* (2011.01)
   *H04N 5/232* (2006.01)
   *H04N 1/409* (2006.01)
   *G06T 5/10* (2006.01)

(52) U.S. Cl.
   CPC ..... *H04N 5/23206* (2013.01); *H04N 5/23245* (2013.01); *H04N 5/3572* (2013.01); *G06T 2207/10004* (2013.01); *G06T 2207/20192* (2013.01)

(58) Field of Classification Search
   CPC ........... G06T 2207/20056; G06T 2207/10024; H04N 9/045; H04N 1/6027; H04N 1/58
   See application file for complete search history.

(56) References Cited

U.S. PATENT DOCUMENTS

| | | | |
|---|---|---|---|
| 2003/0184663 A1 | 10/2003 | Nakano et al. | |
| 2004/0246347 A1* | 12/2004 | Nokita | G06T 5/003 348/222.1 |
| 2006/0093233 A1 | 5/2006 | Kano et al. | |
| 2011/0135213 A1 | 6/2011 | Hatakeyama | |
| 2011/0135216 A1 | 6/2011 | Hatakeyama | |
| 2011/0149103 A1* | 6/2011 | Hatakeyama | G06T 5/003 348/222.1 |
| 2012/0141027 A1 | 6/2012 | Hatakeyama et al. | |
| 2012/0189226 A1* | 7/2012 | Okada | G06T 5/20 382/260 |
| 2013/0215296 A1* | 8/2013 | Oniki | G06T 5/008 348/241 |
| 2015/0310592 A1* | 10/2015 | Kano | H04N 1/58 382/167 |
| 2016/0239946 A1* | 8/2016 | Naruse | G06T 5/003 |
| 2016/0371821 A1* | 12/2016 | Hayashi | H04N 5/3572 |
| 2017/0004603 A1* | 1/2017 | Irie | H04N 5/23229 |

FOREIGN PATENT DOCUMENTS

| | | |
|---|---|---|
| JP | 2009-027750 A | 2/2009 |
| JP | 2011-123589 A | 6/2011 |
| JP | 2013-250946 A | 12/2013 |

OTHER PUBLICATIONS

International Preliminary Report on Patentability and English translation of the Written Opinion of the International Searching Authority (forms PCT/IB/373 and PCT/ISA/237), dated May 3, 2016, for International Application No. PCT/JP2014/075727.

International Search Report for PCT/JP2014/075727 (PCT/ISA/210) dated Dec. 22, 2014.

Written Opinion of the International Searching Authority for PCT/JP2014/075727 (PCT/ISA/237) dated Dec. 22, 2014.

Japanese Notice of Reasons for Rejection dated May 23, 2016, for Japanese Application No. 2015-544876 with the English translation.

* cited by examiner

IMAGE PROCESSING DEVICE, IMAGING APPARATUS, PARAMETER GENERATING METHOD, IMAGE PROCESSING METHOD, AND NON-TRANSITORY COMPUTER READABLE RECORDING MEDIUM STORING A PROGRAM

CROSS-REFERENCE TO RELATED APPLICATIONS

This application is a Continuation of PCT International Application No. PCT/JP2014/075727 filed on Sep. 26, 2014, which claims priority under 35 U.S.C § 119(a) to Patent Application No. 2013-227389 filed in Japan on Oct. 31, 2013, all of which are hereby expressly incorporated by reference into the present application.

BACKGROUND OF THE INVENTION

1. Field of the Invention

The present invention relates to an image processing device, an imaging apparatus, a parameter generating method, an image processing method, and a non-transitory computer readable recording medium storing a program for performing restoration processing and sharpening processing, and in particular, relates to a method of adjusting the restoration strength and the sharpening strength.

2. Description of the Related Art

In a subject image captured through an optical system, a point spread phenomenon may be observed in which a point subject has a very small spread due to the influence of diffraction, aberration, or the like caused by the optical system. A function showing a response to a point light source of the optical system is called a point spread function (PSF), and is known as a parameter affecting the resolution degradation (blur) of a captured image.

In a captured image having an image quality that has been degraded due to the point spread phenomenon, it is possible to recover the image quality by performing point image restoration processing based on the PSF. Point image restoration processing is a process of calculating the degradation characteristics (point image characteristics) due to the aberration of a lens that forms the optical system in advance and canceling out the point spread of a captured image by image processing using a restoration filter (recovery filter) corresponding to the point image characteristics.

If the imaging conditions or a lens is changed, the PSF is changed. Therefore, it is preferable to change a restoration filter used in the point image restoration processing whenever the imaging conditions are changed or a lens is replaced and to perform the point image restoration processing using the restoration filter corresponding to the new imaging conditions or the newly attached lens.

As a representative example of the restoration filter that can be used in the point image restoration processing, a Wiener filter is known. The point image restoration processing using the Wiener filter is a process that is determined mathematically uniquely if the optical transfer function (OTF) of the lens and the imaging system signal-noise ratio (SN ratio) that depends on a frequency are determined.

In addition to the point image restoration processing, image processing for improving the image quality may be performed. For example, it is possible to improve the sharpness of an image by sharpening processing (outline enhancement processing, edge enhancement processing, sharpness enhancement processing, and the like).

As a specific processing method regarding the point image restoration processing and the sharpening processing described above, for example, JP2011-123589A discloses image processing using an image recovery filter to reduce phase degradation components and an edge enhancement filter to reduce amplitude degradation components. JP2006-333061A discloses performing "image stabilization for performing edge enhancement processing after performing image restoration processing using an image restoration filter" and "image stabilization for simply performing edge enhancement processing". JP2009-27750A discloses determining the degree of enhancement of outline components of a video signal according to conditions, such as a diaphragm at the time of imaging. JP2006-129236A discloses changing the strength of a restoration filter itself according to the edge strength by selecting filters having different restoration strengths according to the edge strength.

SUMMARY OF THE INVENTION

Depending on the imaging scene (subject) or the imaging conditions, artifacts (ringing or the like) may be generated in an image due to the point image restoration processing. Therefore, in order to prevent the degradation of image quality, such as artifacts, there is a case where the restoration strength of the point image restoration processing should be weakened. The artifacts should not appear in the point image restoration processing under ideal conditions. In actual processing, however, the frequency characteristics of the input image may be incorrect due to individual variations of the lens or the sensor, non-linear characteristics of signal processing before the point image restoration processing, and the like. As a result, artifacts may be generated.

Alternatively, the point image restoration processing may be turned off in an image processing system in which ON/OFF switching of the point image restoration processing is possible. Even in such a case, it is possible to perform "image processing determined based on different criteria from the PSF" designed without considering the optical characteristics (PSF and OTF) of the lens or Wiener filter design criteria. Examples of the "image processing determined based on different criteria from the PSF" include image processing based on the subjective evaluation of the designer, fine adjustment of image quality based on the user's preferences, and fine adjustment of the sharpness by the user in consideration of the individual variations of the lens.

Here, when a "point image restoration processing ON image" and a "point image restoration processing OFF image ("image processing determined based on different criteria from the PSF" ON image)" are compared, sharpness in the "point image restoration processing OFF image" can be stronger than that in the "point image restoration processing ON image". This is reasonable in terms of content of processing. However, since the sharpness in the image subjected to the point image restoration processing (image quality recovery processing) becomes weaker than that in the image that has not been subjected to the point image restoration processing, the user may have a feeling of mismatch between the quality of an actual image and the intuition. There is also a case where the sharpness difference between the "point image restoration processing ON image" and the "point image restoration processing OFF image" is excessive. In this case, the user may feel inconvenienced in terms of operability. Even in the case of performing the point image restoration processing by changing the restoration strength in order to avoid the degradation of image quality, the same inconvenience may be caused. In this case, since the sharpness varies between images subjected to the point image restoration processing, the user feels inconvenienced.

No effective proposals for preventing the variation in image quality sharpness between images subjected to point image restoration processes having different restoration strengths or the difference in image quality sharpness between the "point image restoration processing ON image" and the "point image restoration processing OFF image" have been made in the related art. For example, in the device disclosed in JP2011-123589A, image processing using an image recovery filter and image processing using an edge enhancement filter are performed. However, JP2011-123589A does not disclose or propose adjusting the degree of image recovery and the degree of edge enhancement by correlating both the image processes with each other. The same applies for the image processing techniques disclosed in JP2006-333061A, JP2009-27750A, and JP2006-129236A. JP2006-333061A, JP2009-27750A, and JP2006-129236A do not disclose or propose unifying the image sharpness by performing integrated adjustment of the degree of restoration and the degree of sharpening between the point image restoration processing and the sharpening processing.

The present invention has been made in view of the aforementioned situation, and it is an object of the present invention to provide an image processing technique and its relevant techniques capable of stably improving the image quality without excessively changing the image sharpness even if there is a variation in the restoration strength of the point image restoration processing or ON/OFF switching of the point image restoration processing.

An aspect of the present invention relates to an image processing device which includes a restoration processing unit that performs restoration processing using a restoration filter based on a point spread function for image data that is acquired from an imaging element by imaging a subject using an optical system, a sharpening processing unit that performs sharpening processing using a sharpening filter for the image data, and a sharpness restoration control unit that is able to adjust a restoration rate of the image data based on the restoration processing and the sharpening rate of the image data based on the sharpening processing by controlling the restoration processing unit and the sharpening processing unit and in which the sharpness restoration control unit acquires a total sharpness restoration rate based on the restoration rate and the sharpening rate, acquires one of the restoration rate and the sharpening rate, and calculates the other one of the restoration rate and the sharpening rate based on the total sharpness restoration rate.

According to this aspect, since the restoration rate and the sharpening rate are determined based on the total sharpness restoration rate, the sharpening rate is adjusted according to the change in the restoration, or the restoration rate is adjusted according to the change in the sharpening rate. Accordingly, it is possible to stably improve the image quality of image data without excessively changing the restoration strength of the restoration processing and the sharpening strength of the sharpening processing.

The "restoration filter based on the point spread function" is a restoration filter based on an inverse filter, a Wiener filter, or the like generated using the point spread function (PSF) of the optical system, and the "restoration processing" includes processing for applying such a restoration filter to image data. The "point spread function" is a function showing a response to a point light source of the optical system, and can be expressed based on the PSF, an OTF (modulation transfer function (MTF)), and a phase transfer function (PTF).

On the other hand, as the "sharpening filter", it is possible to use filters other than a "filter (restoration filter) generated using an inverse filter or a Wiener filter from the point spread function (PSF) of the optical system". Accordingly, as the "sharpening filter", for example, a filter that is not based on the point spread function of the optical system can be appropriately used. A filter calculated based on other elements (parameters) other than the point spread function can be adopted as the "sharpening filter". As the sharpening filter that is not based on the point spread function, a filter that is switchable according to a diaphragm value having a different point spread function or the like can be adopted as a sharpening filter if the filter is a filter created without depending on the point spread function. Similarly, a filter that is switchable according to an image height having a different point spread function can be adopted as a sharpening filter. The strength (gain) of the sharpening filter in the sharpening processing may be changed according to the diaphragm value or the image height.

The "sharpening processing" is processing for compensating for or emphasizing high frequency components of image data, and is processing for emphasizing outline components of the image. Accordingly, for example, processing called outline enhancement processing, edge enhancement processing, or sharpness enhancement processing is included in the "sharpening processing" referred to herein.

In addition, the restoration filter and the sharpening filter can be formed as a finite impulse response (FIR) filter.

Preferably, the sharpness restoration control unit acquires the restoration rate, and calculates the sharpening rate based on the total sharpness restoration rate and the restoration rate.

According to this aspect, the sharpening rate is adjusted according to the restoration rate, and the influence of a change in the restoration rate can be compensated for by the sharpening rate based on the total sharpness restoration rate.

Preferably, the sharpness restoration control unit determines the restoration rate based on a designated restoration rate that is designated by a user.

According to this aspect, the restoration rate of the restoration processing can be determined based on the designated restoration rate that is designated by the user.

Preferably, the restoration rate is determined based on optical characteristics information indicating characteristics of the optical system.

According to this aspect, it is possible to perform restoration processing reflecting the optical characteristics information.

Preferably, the optical system includes an optical system storage unit that stores the optical characteristics information, and the restoration rate is determined based on the optical characteristics information stored in the optical system storage unit.

According to this aspect, since it is possible to determine the restoration rate based on the optical characteristics information stored in the optical system storage unit, it is possible to determine the appropriate restoration rate even in a case where the optical characteristics information is changed. For example, this aspect is preferable in a case where the optical system is replaceable.

Preferably, the sharpness restoration control unit acquires the sharpening rate, and calculates the restoration rate based on the total sharpness restoration rate and the sharpening rate.

According to this aspect, the restoration rate is adjusted according to the sharpening rate, and the influence of a change in the sharpening rate can be compensated for by the restoration rate based on the total sharpness restoration rate.

Preferably, the sharpness restoration control unit determines the sharpening rate based on imaging setting conditions in imaging of the image data.

According to this aspect, it is possible to perform the sharpening processing with the sharpening rate corresponding to the imaging setting conditions. Therefore, for example, even if the imaging setting conditions are changed, it is possible to perform the sharpening processing with the appropriate sharpening rate.

Preferably, the sharpening rate is determined based on optical characteristics information indicating characteristics of the optical system.

According to this aspect, it is possible to perform the sharpening processing with the sharpening rate corresponding to the optical characteristics information. Therefore, for example, even if the optical characteristics information is changed, it is possible to perform the sharpening processing with the appropriate sharpening rate.

Preferably, the optical system includes an optical system storage unit that stores the optical characteristics information, and the sharpening rate is determined based on the optical characteristics information stored in the optical system storage unit.

According to this aspect, since it is possible to determine the sharpening rate based on the optical characteristics information stored in the optical system storage unit, it is possible to determine the appropriate sharpening rate even in a case where the optical characteristics information is changed. For example, this aspect is preferable in a case where the optical system is replaceable.

Preferably, the optical characteristics information includes type information of a lens provided in the optical system.

According to this aspect, it is possible to determine an appropriate restoration rate or an appropriate sharpening rate according to the type information of the lens provided in the optical system. The optical characteristics are influenced by the lens type. In particular, the point spread phenomenon is determined by the PSF unique to each lens type. Accordingly, an excellent restoration effect is obtained by determining the restoration rate of the restoration processing based on the point spread function in consideration of the type information of the lens provided in the optical system. In particular, even in a case where there is a deviation in matching between the restoration filter and the point spread function of the optical system, it is possible to cover this deviation with the restoration rate. In addition, by performing the sharpening processing with the sharpening rate that is calculated based on the restoration rate and the total sharpness restoration rate, it is possible to stably improve the quality of image data.

Preferably, the optical characteristics information includes individual differences information of the optical system.

According to this aspect, it is possible to determine an appropriate restoration rate or an appropriate sharpening rate according to the individual differences information of the optical system. The optical characteristics are influenced by each optical system, and the point spread phenomenon is determined by the PSF unique to each optical system in particular. However, there are individual differences due to manufacturing error or the like even in the same type of optical system. Accordingly, an excellent restoration effect is obtained by determining the restoration rate of the restoration processing based on the point spread function in consideration of the individual differences information of the optical system. In particular, even in a case where there is a deviation in matching between the restoration filter and the point spread function of the optical system, it is possible to cover the gap with the restoration rate. In addition, by performing the sharpening processing with the sharpening rate that is calculated based on the restoration rate and the total sharpness restoration rate, it is possible to stably improve the quality of image data.

The "individual differences information" includes information regarding the error that may occur individually in the optical system due to manufacturing error or the like. The individual differences information may indicate the individual differences directly or indirectly. For example, a lot number or a serial number assigned to an optical system may be used as the individual differences information.

Preferably, the optical characteristics information includes imaging setting conditions.

According to this aspect, it is possible to determine an appropriate restoration rate and an appropriate sharpening rate according to the imaging setting conditions. The optical characteristics are influenced by the imaging setting conditions. In particular, the point spread phenomenon is determined by the PSF unique to each optical system. However, the PSF varies depending on the imaging setting conditions. Accordingly, an excellent restoration effect is obtained by determining the restoration processing based on the point spread function in consideration of the imaging setting conditions. In particular, even in a case where there is a deviation in matching between the restoration filter and the point spread function of the optical system, it is possible to cover the gap with the restoration rate. In addition, by performing the sharpening processing with the sharpening rate that is calculated based on the restoration rate and the total sharpness restoration rate, it is possible to stably improve the quality of image data.

Preferably, the sharpness restoration control unit acquires a diaphragm value of the optical system when acquiring the image data and compares the diaphragm value with a first threshold value. At least in a case where the diaphragm value indicates that a diaphragm is more opened than a diaphragm expressed by the first threshold value, the sharpness restoration control unit acquires one of the restoration rate and the sharpening rate, and calculates the other one of the restoration rate and the sharpening rate based on the total sharpness restoration rate.

According to this aspect, in a case where the diaphragm is opened, one of the restoration rate and the sharpening rate is acquired, and the other one of the restoration rate and the sharpening rate is calculated based on the total sharpness restoration rate.

Preferably, the sharpness restoration control unit acquires imaging mode information when acquiring the image data, and maintains the total sharpness restoration rate constant in a case where the imaging mode information indicates a motion picture recording mode.

According to this aspect, the total sharpness restoration rate is maintained constant in the motion picture recording mode, and it is possible to prevent a change in the total sharpness restoration rate during motion picture recording. Therefore, it is possible to satisfactorily maintain the continuity of the quality of a recording motion picture (image data).

Preferably, in a case where the imaging mode information indicates the motion picture recording mode, the sharpness restoration control unit sets the restoration rate to be smaller than that in a case where the imaging mode information indicates a still image recording mode.

According to this aspect, since the restoration rate in the motion picture recording mode is smaller than the restoration rate in the still image recording mode, it is possible to effectively prevent overcorrection or the like in the restoration processing on the motion picture.

Preferably, the restoration filter is determined based on imaging setting conditions in imaging of the image data.

According to this aspect, it is possible to perform the restoration processing using the restoration filter corresponding to the imaging setting conditions.

Preferably, the imaging setting conditions include setting conditions affecting the point spread function.

According to this aspect, since the setting conditions affecting the point spread function are used as the imaging setting conditions, it is possible to perform image processing (restoration processing) capable of effectively removing the influence of the point spread phenomenon.

Preferably, the setting conditions include at least any one of diaphragm information, zoom information, subject distance information, or lens type information of the optical system.

According to this aspect, it is possible to perform image processing (restoration processing) capable of effectively removing the influence of the point spread phenomenon.

Preferably, the imaging setting conditions include imaging conditions that do not affect the point spread function.

According to this aspect, it is possible to perform image processing capable of effectively removing influences other than the point spread phenomenon.

Preferably, the imaging conditions include at least any one of imaging sensitivity information or imaging mode information.

According to this aspect, it is possible to perform the image processing based on at least any one of the imaging sensitivity information or the imaging mode information.

Preferably, the image processing device further includes: a restoration filter storage unit that stores a plurality of the restoration filters based on point spread functions of a plurality of the optical systems; and a restoration filter selection unit that selects the restoration filter based on the point spread function of the optical system used in imaging of the image data, from the restoration filter storage unit, based on the imaging setting conditions. It is preferable that the restoration processing unit performs the restoration processing using the restoration filter selected by the restoration filter selection unit.

According to this aspect, since the restoration filter based on the imaging setting conditions is selected from the restoration filter storage unit and is used in the restoration processing, it is possible to easily determine the restoration filter.

Preferably, the restoration filter is used in common for a plurality of optical systems.

According to this aspect, since the restoration filter is used in common for a plurality of optical systems, it is possible to perform the restoration processing easily by simplifying the restoration filter determination processing. By using the restoration filter in common for a plurality of optical systems, even in a case where there is a deviation in matching between the restoration filter and the point spread function of the optical system, it is possible to cover the gap with the restoration rate. In addition, by performing the sharpening processing with the sharpening rate that is calculated based on the restoration rate and the total sharpness restoration rate, it is possible to stably improve the quality of image data. This aspect is suitable for a case where the optical system is replaceable.

Preferably, the restoration filter is used in common for a plurality of imaging setting conditions.

According to this aspect, since the restoration filter is used in common for a plurality of imaging setting conditions, it is possible to perform the restoration processing easily by simplifying the restoration filter determination processing. By using the restoration filter in common for a plurality of imaging setting conditions, even in a case where there is a deviation in matching between the restoration filter and the point spread function of the optical system, it is possible to cover the gap with the restoration rate. In addition, by performing the sharpening processing with the sharpening rate that is calculated based on the restoration rate and the total sharpness restoration rate, it is possible to stably improve the quality of image data.

Preferably, the plurality of imaging setting conditions include zoom information of the optical system.

According to this aspect, since a restoration filter is used in common for a plurality of optical system zoom conditions, it is possible to perform the restoration processing easily by simplifying the restoration filter determination processing.

Preferably, the sharpness restoration control unit adjusts the total sharpness restoration rate to a target sharpness restoration rate at a first frequency.

According to this aspect, since the restoration rate and the sharpening rate at least at the first frequency of the image data are determined by the target sharpness restoration rate, it is possible to satisfactorily maintain the degree of restoration and the degree of sharpening of image components at least at the first frequency.

Although the "first frequency" and the "target sharpness restoration rate" are not particularly limited, the "first frequency" and the "target sharpness restoration rate" may be determined based on the visual characteristics of the user, for example.

Preferably, the restoration processing unit and the sharpening processing unit are provided in series, and the image data is subjected to one of the restoration processing and the sharpening processing and is then subjected to the other processing.

According to this aspect, the restoration processing and the sharpening processing are performed in series.

Preferably, the restoration processing unit and the sharpening processing unit are provided in parallel, the image data is input to the restoration processing unit and the sharpening processing unit, and increment or decrement data of the image data due to the restoration processing and increment or decrement data of the image data due to the sharpening processing are added together.

According to this aspect, the restoration processing and the sharpening processing are performed in parallel.

Preferably, the image processing device may further include a non-linear processing unit that performs non-linear processing of the image data.

According to this aspect, it is possible to determine an appropriate restoration rate and an appropriate sharpening rate in a system in which the non-linear processing of image data is performed. The non-linear processing referred to herein may include all processes including processing other than arithmetic processing expressed by linear expressions. Typically, processing including conditional branching processing is the non-linear processing.

Preferably, the non-linear processing unit is included in at least any one of the restoration processing unit or the sharpening processing unit.

According to this aspect, even in a case where the restoration processing and/or the sharpening processing include the non-linear processing, it is possible to determine an appropriate restoration rate and an appropriate sharpening rate.

Preferably, the non-linear processing is clipping processing for adjusting a pixel value exceeding a clip threshold value among the pieces of image data to the clip threshold value.

According to this aspect, even in a case where the clipping processing is performed, it is possible to determine an appropriate restoration rate and an appropriate sharpening rate.

Preferably, the optical system is replaceably attached to an imaging body in which the imaging element is mounted.

According to this aspect, even if the optical system is replaceable, it is possible to determine an appropriate restoration rate and an appropriate sharpening rate.

Another aspect of the present invention relates to an imaging apparatus including any of the image processing devices described above.

Still another aspect of the present invention relates to a parameter generating method for generating a parameter used in an image processing unit including a restoration processing unit that performs restoration processing using a restoration filter based on a point spread function for image data acquired from an imaging element by imaging a subject using an optical system and a sharpening processing unit that performs sharpening processing using a sharpening filter for the image data, and relates to a parameter generating method including: a step of acquiring a total sharpness restoration rate based on a restoration rate of the image data based on the restoration processing and a sharpening rate of the image data based on the sharpening processing; and a step of acquiring one of the restoration rate and the sharpening rate and calculating the other one of the restoration rate and the sharpening rate based on the total sharpness restoration rate.

Still another aspect of the present invention relates to an image processing method including: a restoration processing step of performing restoration processing using a restoration filter based on a point spread function for image data acquired from an imaging element by imaging a subject using an optical system; a sharpening processing step of performing sharpening processing using a sharpening filter for the image data; a step of acquiring a total sharpness restoration rate based on a restoration rate of the image data based on the restoration processing and a sharpening rate of the image data based on the sharpening processing; and a step of acquiring one of the restoration rate and the sharpening rate and calculating the other one of the restoration rate and the sharpening rate based on the total sharpness restoration rate.

Still another aspect of the present invention relates to a program causing a computer to execute: a procedure of performing restoration processing using a restoration filter based on a point spread function for image data acquired from an imaging element by imaging a subject using an optical system; a procedure of performing sharpening processing using a sharpening filter for the image data; a procedure of acquiring a total sharpness restoration rate based on a restoration rate of the image data based on the restoration processing and a sharpening rate of the image data based on the sharpening processing; and a procedure of acquiring one of the restoration rate and the sharpening rate and calculating the other one of the restoration rate and the sharpening rate based on the total sharpness restoration rate.

According to the present invention, since the restoration rate and the sharpening rate are determined based on the total sharpness restoration rate, it is possible to prevent the restoration rate and the sharpening rate of the image based on the restoration processing and the sharpening processing from becoming too large or too small. Therefore, even if there is a variation in the restoration strength of the restoration processing or ON/OFF switching of the restoration processing, it is possible to provide image data with good quality without excessively changing the sharpness.

BRIEF DESCRIPTION OF THE DRAWINGS

FIG. 7A shows an example of the "frequency-gain" relationship in the sharpening processing (outline enhancement filter processing section), FIG. 7B shows an example of the "frequency-gain" relationship in the point image restoration processing (point image restoration filter processing section), and FIG. 7C shows an example of the "frequency-gain" relationship in the entire sharpening processing and point image restoration processing.

DESCRIPTION OF THE PREFERRED EMBODIMENTS

Embodiments of the present invention will be described with reference to the accompanying diagrams. In the following embodiments, a case where the present invention is applied to a digital camera (imaging apparatus) connectable to a computer (personal computer (PC)) will be described as an example.

Figure 1:
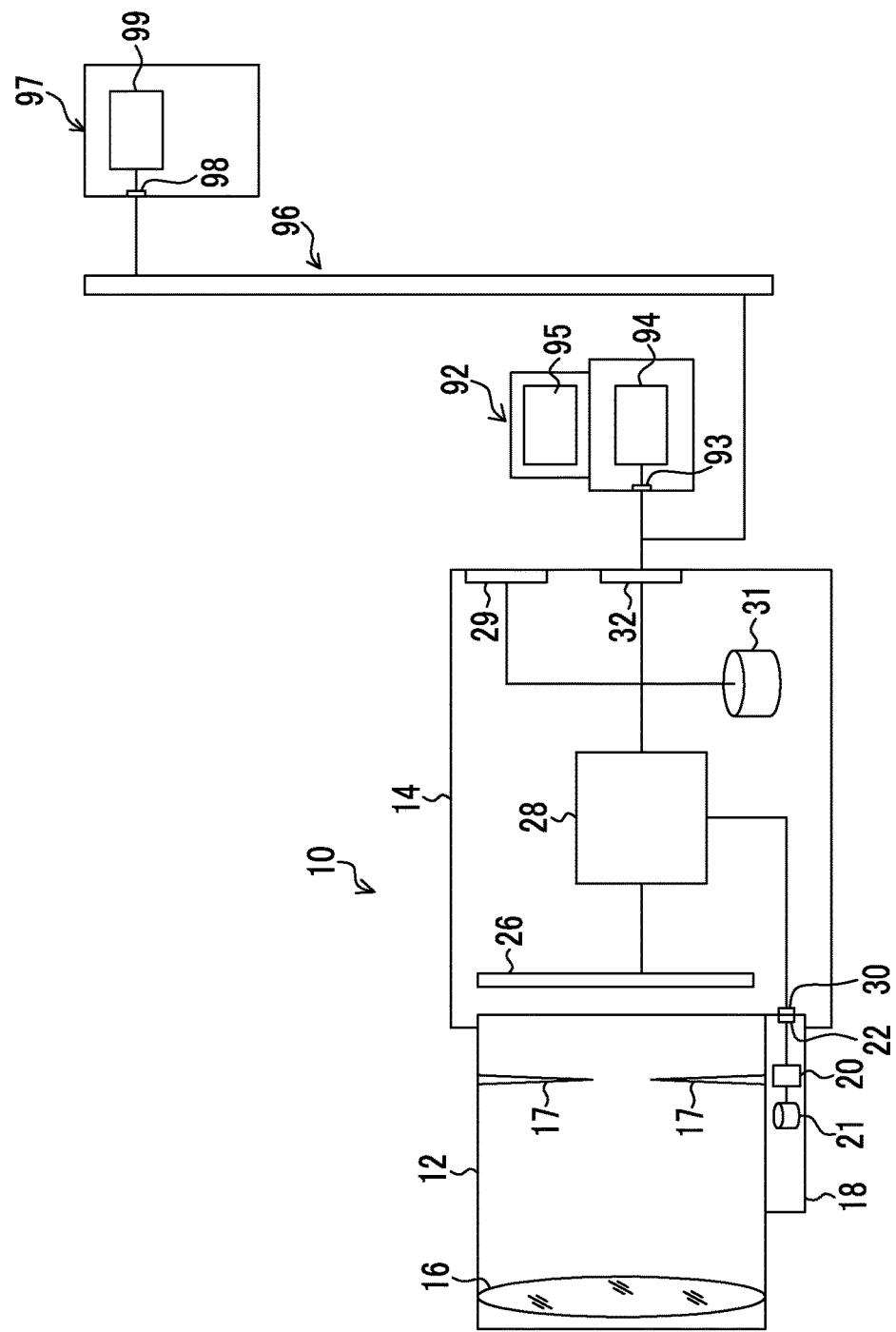
FIG. 1 is a block diagram showing a digital camera connected to a computer.

FIG. 1 is a block diagram showing a digital camera connected to a computer. In a digital camera 10 in this example, a lens unit 12 that is an example of the optical system is replaceably attached to a camera body (imaging body) 14 in which an imaging element 26 is mounted, and an image processing device is provided in the camera body 14.

That is, the digital camera 10 includes the replaceable lens unit 12 and the camera body 14 that includes the imaging element 26, and the lens unit 12 and the camera body 14 are electrically connected to each other through a lens unit input and output section 22 of the lens unit 12 and a camera body input and output unit 30 of the camera body 14.

The lens unit 12 that is an example of the optical system includes a lens 16, a diaphragm 17, and an optical system operation unit 18 that controls the optical system. The optical system operation unit 18 includes a lens unit controller 20 connected to the lens unit input and output section 22, a lens unit storage unit 21 that stores various kinds of information (optical system information or the like), and an actuator (not shown) to operate the optical system. The lens unit controller 20 controls the optical system through the actuator based on a control signal transmitted through the lens unit input and output section 22 from the camera body 14. For example, the lens unit controller 20 performs focus control or zoom control by lens movement, control of the amount of diaphragm of the diaphragm 17, and the like. In addition, the lens unit controller 20 reads out various kinds of information stored in the lens unit storage unit 21 based on the control signal transmitted through the lens unit input and output section 22 from the camera body 14, and transmits the information to the camera body 14 (body controller 28).

The imaging element 26 of the camera body 14 includes a condensing microlens, color filters of red (R), green (G), and blue (B), and image sensors (photodiodes; a complementary metal oxide semiconductor (CMOS), a charge coupled device (CCD), and the like). The imaging element 26 converts light of a subject image, which is emitted through the lens 16, the diaphragm 17, and the like that form an optical system in the lens unit 12, into an electrical signal, and transmits an image signal (original image data) to the body controller 28.

Although details will be described later (refer to FIG. 2), the body controller 28 has a function as a device control unit that performs overall control of each unit of the digital camera 10 and a function as an image processing unit that performs image processing of image data transmitted from the imaging element 26.

The digital camera 10 further includes other devices (shutter and the like) required for imaging or the like, and some of the devices form a user interface 29 that can be checked and operated by the user. The user interface 29 can be disposed in the lens unit 12 and/or the camera body 14. In the example shown in FIG. 1, the user interface 29 is provided in the camera body 14. Through the user interface 29, the user can determine and change various settings (exposure value (EV) value and the like) for imaging or the like, give an imaging instruction, check a live preview image and a captured image, and the like. The user interface 29 is connected to the body controller 28, and various setting determined and changed by the user and various instructions are reflected in various processes (device control processing, image processing, and the like) in the body controller 28.

Image data subjected to the image processing in the body controller 28 is stored in a main body storage unit 31 provided in the camera body 14, and is transmitted to a computer 92 or the like through an input and output interface 32 when necessary. The main body storage unit 31 is formed by an arbitrary memory body, and a replaceable memory, such as a memory card, is appropriately used. The format of the image data output from the body controller 28 is not particularly limited, and can be any format, such as RAW, joint photographic experts group (JPEG), and tagged image file format (TIFF). The body controller 28 may form header information (imaging information (imaging date and time, a model, the number of pixels, a diaphragm value, and the like)) and a plurality of pieces of associated data, such as main image data and thumbnail image data, as one image file so as to be associated with each other as a so-called exchangeable image file format (Exif), and output the image file.

The computer 92 is connected to the digital camera 10 through the input and output interface 32 of the camera body 14 and a computer input and output unit 93, and receives data, such as the image data transmitted from the camera body 14. A computer controller 94 performs overall control of the computer 92, performs image processing on the image data from the digital camera 10, and controls communication with a server 97 or the like connected to the computer input and output unit 93 through a network line, such as the Internet 96. The computer 92 includes a display 95, and the content of processing in the computer controller 94 or the like is displayed on the display 95 when necessary. The user can input data or a command to the computer controller 94 by operating input means (not shown), such as a keyboard, while checking the display of the display 95. Therefore, the user can control the computer 92 or devices (the digital camera 10 and the server 97) connected to the computer 92.

The server 97 includes a sever input and output unit 98 and a server controller 99. The sever input and output unit 98 forms a connection unit for transmission and reception of signals to and from an external device, such as the computer 92, and is connected to the computer input and output unit 93 of the computer 92 through a network line, such as the Internet 96. In response to the control signal from the computer 92, the server controller 99 transmits and receives data to and from the computer controller 94, when necessary, in cooperation with the computer controller 94, downloads the data to the computer 92, performs arithmetic processing, and transmits the calculation result to the computer 92.

Each controller (the lens unit controller 20, the body controller 28, the computer controller 94, and the server controller 99) includes circuits required for control processing, for example, an arithmetic processing circuit (central processing unit (CPU) or the like) or a memory. Communication between the digital camera 10, the computer 92, and the server 97 may be performed through a wired line or wirelessly. The computer 92 and the server 97 may be integrally formed, and the computer 92 and/or the server 97 may be omitted. The digital camera 10 may be made to have a function of communication with the server 97, so that the transmission and reception of data are directly performed between the digital camera 10 and the server 97.

Figure 2:
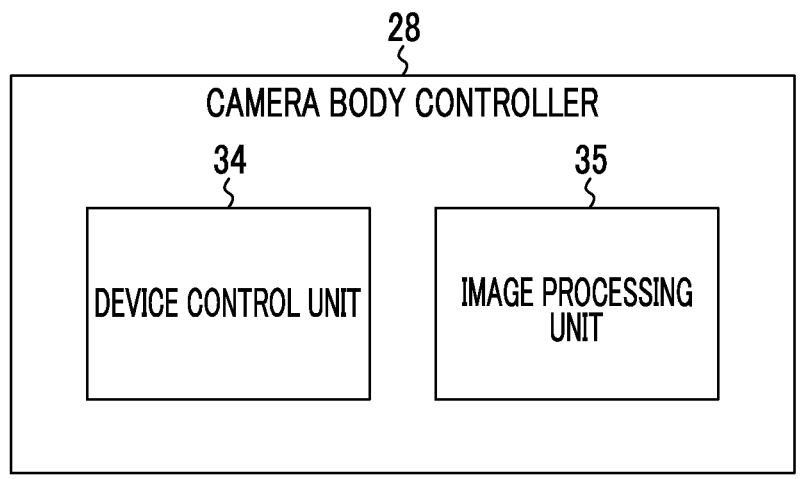
FIG. 2 is a block diagram showing an example of the configuration of a body controller.

FIG. 2 is a block diagram showing an example of the configuration of the body controller 28. The body controller 28 includes a device control unit 34 and an image processing unit 35, and performs overall control of the camera body 14.

The device control unit 34 controls the output of an image signal (image data) from the imaging element 26, generates a control signal for controlling the lens unit 12 and transmits the control signal to the lens unit 12 (lens unit controller 20) through the camera body input and output unit 30, stores image data before and after image processing (RAW data, JPEG data, or the like) in the main body storage unit 31, and transmits the image data before and after image processing (RAW data, JPEG data, or the like) to an external device (computer 92 or the like) connected through the input and output interface 32, for example. In addition, the device control unit 34 appropriately controls various devices provided in the digital camera 10, such as a display unit (an electronic view finder (EVF), a back liquid crystal display unit: user interface 29).

On the other hand, the image processing unit 35 performs arbitrary image processing on the image signal from the imaging element 26 when necessary. Various kinds of image processing, for example, sensor correction processing, demosaic (synchronization) processing, pixel interpolation processing, color correction processing (offset correction processing, white balance processing, color matric processing, gamma conversion processing, and the like), RGB image processing (sharpness processing, tone correction processing, exposure correction processing, outline correction processing, and the like), RGB/YCrCb conversion processing, and image compression processing are appropriately performed in the image processing unit 35. In particular, the image processing unit 35 in this example performs restoration processing (point image restoration processing) based on the point spread function of the optical system and sharpening processing that is not based on the point spread function, such as outline enhancement processing, on the image signal (image data).

Figure 3:
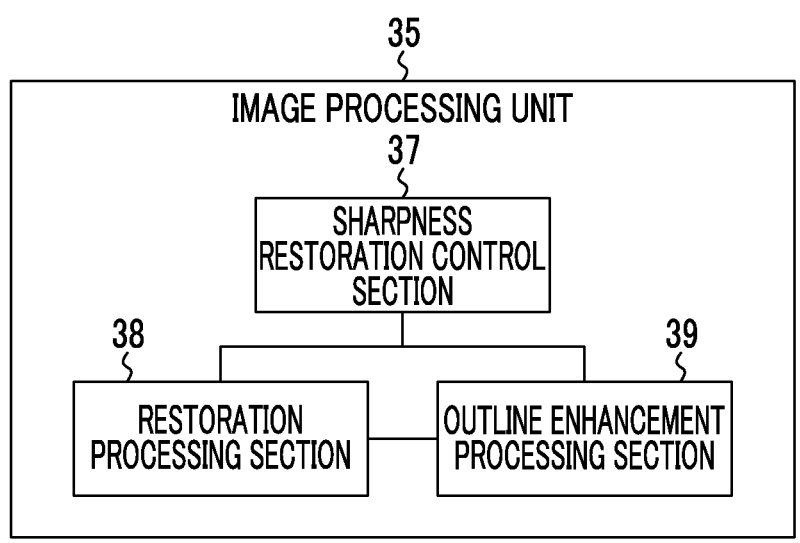
FIG. 3 is a block diagram showing an example of the configuration of an image processing unit, and in particular, shows the configuration relevant to point image restoration processing and sharpening processing.

FIG. 3 is a block diagram showing an example of the configuration of the image processing unit 35, and in particular, shows the configuration relevant to point image restoration processing and sharpening processing.

The image processing unit 35 in this example includes a sharpness restoration control section 37, a restoration processing section 38, and an outline enhancement processing section (sharpening processing section) 39.

The restoration processing section 38 performs restoration processing using a restoration filter based on the point spread function for the image data that is acquired from the imaging element 26 by the imaging of the subject using the optical system (lens 16 or the like) (restoration processing step). The restoration filter is a filter to recover the PSF degradation. For example, a Wiener filter can be appropriately used as a restoration filter. On the other hand, the outline enhancement processing section 39 performs sharpening processing using a sharpening filter, which is not based on the point spread function, on image data (sharpening processing step). The sharpening filter is not particularly limited if a filter reflecting the point spread function directly is not used, and a known outline enhancement filter can be used as a sharpening filter.

For each of the restoration filter and the sharpening filter, a single filter may be prepared for the entire image, or different filters may be prepared for each position (each image height) in the image.

The sharpness restoration control section 37 controls the restoration processing section 38 and the outline enhancement processing section 39 to adjust the restoration rate of image data by the restoration processing and the sharpening rate of image data by the sharpening processing. For the adjustment of the restoration rate and the sharpening rate, the sharpness restoration control section 37 in this example acquires a total sharpness restoration rate based on the restoration rate and the sharpening rate, acquires one of the restoration rate and the sharpening rate, and calculates the other one of the restoration rate and the sharpening rate based on the total sharpness restoration rate.

In the case of performing the point image restoration processing in addition to the sharpening processing, the sharpness restoration strength may be too strong to cause overcorrection of the image or the like in the conventional technique. This may damage the image quality. Accordingly, in the case of performing both the sharpening processing and the point image restoration processing, it is preferable to weaken the sharpening strength in the sharpening processing and the restoration strength in the point image restoration processing compared with a case of performing only the point image restoration processing or only the sharpening processing.

The point image restoration processing may cause artifacts (ringing or the like) or the like by incorrect correction depending on an imaging scene or a subject. In the case of using different restoration filters according to the imaging conditions, there may be a variation in the restoration rate or the sense of resolution (sharpness) of an image after the point image restoration processing. The variation in the sharpness of the image or the incorrect correction becomes more noticeable by performing the sharpening processing.

The following embodiments relate to techniques for obtaining a clear image by recovering the image quality, which is damaged by the point spread phenomenon of the optical system, by effectively preventing the overcorrection or the incorrect correction described above even in a case where the point image restoration processing and the sharpening processing are combined.

Figure 4:
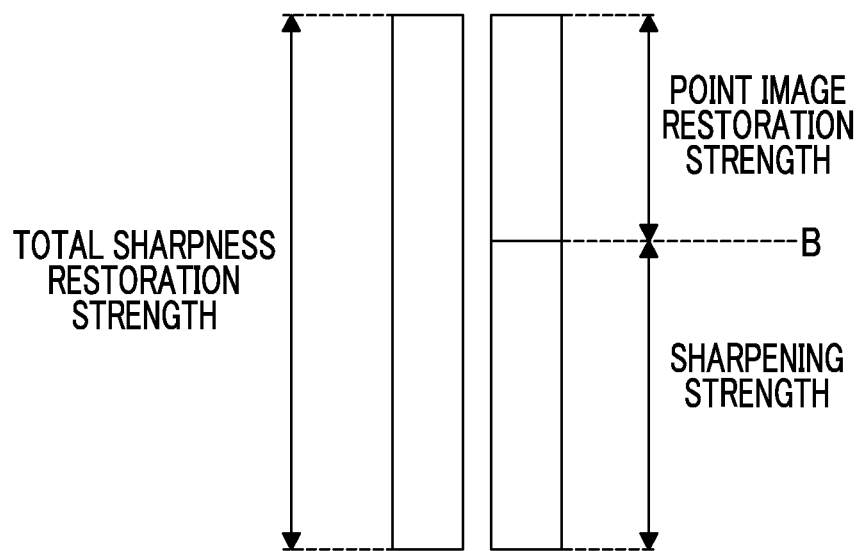
FIG. 4 is a conceptual diagram illustrating the adjustment of the point image restoration strength and the sharpening strength.

FIG. 4 is a conceptual diagram illustrating the adjustment of the point image restoration strength and the sharpening strength. The "total sharpness restoration strength (total sharpness restoration rate)" in FIG. 4 is a final sharpness target strength value determined from the desired image quality, and shows directly or indirectly the magnitude ratio between the input and the output for the entire image processing. Although the "total sharpness restoration strength (total sharpness restoration rate)" in this example may change according to the imaging setting conditions (an example of optical characteristics information), the "total sharpness restoration strength (total sharpness restoration rate)" becomes a fixed value if the imaging setting conditions are determined. Various imaging conditions and setting conditions, for example, a lens, a diaphragm, zoom, a subject distance, sensitivity, and an imaging mode, are included in the imaging setting conditions. In addition, the "point image restoration strength" is restoration strength based on the point image restoration processing, and is determined according to the imaging setting conditions (an example of optical characteristics information). The "sharpening strength" is the strength of sharpening by the sharpening processing.

The total sharpness restoration strength, the point image restoration strength, and the sharpening strength are indices indicating the degree of image change before and after image processing, and are determined according to any of the criteria that can appropriately express the degree of change in the image. Therefore, in a case where each of the point image restoration processing and the sharpening processing includes filter application processing and gain control processing, changes before and after the "filter application processing and the gain control processing" are expressed by the point image restoration strength and the sharpening strength.

For example, a case is assumed in which the point image restoration processing and the sharpening processing are performed in parallel and the "degree of image restoration (point image restoration strength) by the point image restoration processing" and the "degree of image sharpening (sharpening strength) by the sharpening processing" are determined by the "total sharpness restoration strength". In this case, since the relationship of "point image restoration strength+sharpening strength=total sharpness restoration strength" is satisfied, the sharpening strength may be changed by the amount of increase or decrease in the point image restoration strength, and the boundary position (B) between the point image restoration strength and the sharpening strength shown in FIG. 4 may be changed. Therefore, for example, if the total sharpness restoration strength and the point image restoration strength are determined, it is possible to calculate the optimal sharpening strength from both the total sharpness restoration strength and the point image restoration strength. Similarly, if the total sharpness restoration strength and the sharpening strength are determined, it is possible to calculate the optimal point image restoration strength from both the total sharpness restoration strength and the sharpening strength.

FIG. 4 just shows an intuitive conceptual diagram for easy understanding, and does not indicate that the relationship of "point image restoration strength+sharpening strength=total sharpness restoration strength" is always satisfied in the processing system that performs the point image restoration processing and the sharpening processing. For example, in a case where the point image restoration processing and the sharpening processing are performed in series, the total sharpness restoration strength is determined based on the product of the point image restoration strength and the sharpening strength. Therefore, in the following embodiments, the point image restoration strength and the sharpening strength are determined so that the "frequency amplification factor based on both the point image restoration strength and the sharpening strength" matches the "frequency amplification factor based on the total sharpness restoration strength".

For example, it is possible to set the point image restoration strength preferentially and adjust the sharpening strength according to the set point image restoration strength. In this case, it is possible to accurately perform the point image restoration processing according to the PSF of the optical system (lens 16 or the like). In addition, the point image restoration processing is delicate processing, and may cause adverse effects, such as overcorrection, if the basic parameters are not correct. However, it is possible to effectively prevent the adverse effects, such as overcorrection, by determining the point image restoration strength preferentially.

On the other hand, it is also possible to set the sharpening strength preferentially and adjust the point image restoration strength according to the set sharpening strength. In this case, the sharpening processing that is stable processing with less adverse effects is preferentially performed. The case of performing the sharpening processing preferentially is suitable for a case of performing imaging using an optical system (lens 16 or the like) having a good accuracy in optical characteristics, a case where the imaging scene is a night scene or a portrait, a case where art filter processing is performed, a case where it is difficult to obtain the effect of the point image restoration processing, a case where the adverse effects of the point image restoration processing are likely to occur.

The adjustment of the point image restoration strength and the sharpening strength can be performed by various criteria. For example, the total sharpness restoration strength is determined so that the frequency amplification factor at a specific frequency or a specific image position (image height position) is the same.

By adjusting the point image restoration strength and the sharpening strength by setting the total sharpness restoration strength as described above, a variation in the sharpness (restoration rate and the sense of resolution) of the image subjected to the point image restoration processing and the sharpening processing is suppressed. As a result, it is possible to improve the overall quality of the output image.

Specific embodiments regarding the adjustment of the point image restoration strength and the sharpening strength will be described below.

First Embodiment

The sharpness restoration control section 37 according to the present embodiment acquires a restoration rate in the point image restoration processing, and calculates a "sharpening rate" in the sharpening processing based on the total sharpness restoration rate and the restoration rate.

Figure 5:
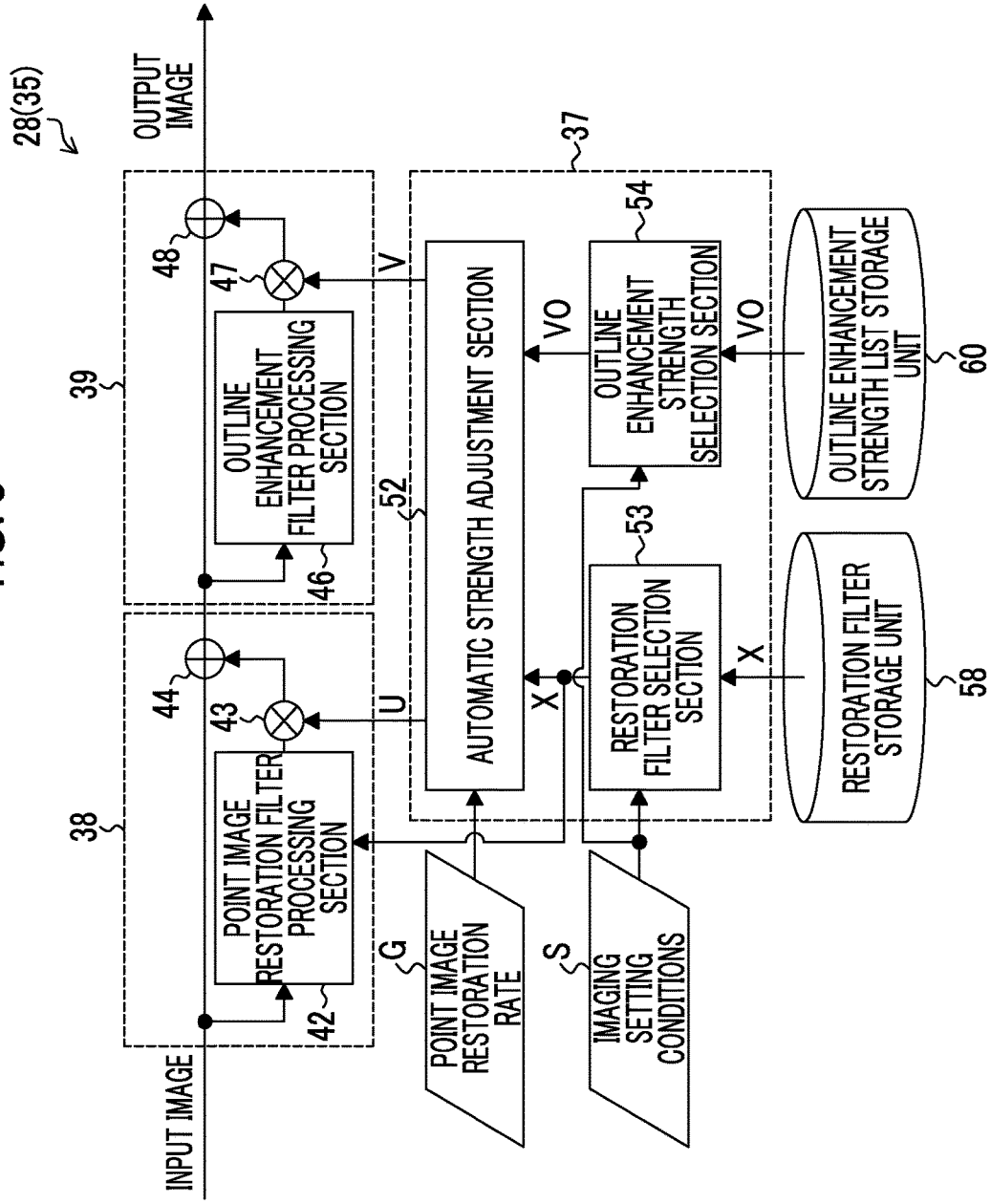
FIG. 5 is a diagram showing the configuration of a processing block that performs point image restoration processing and sharpening processing according to a first embodiment.

FIG. 5 is a diagram showing the configuration of a processing block that performs point image restoration processing and sharpening processing according to a first embodiment.

In the image processing system model of the present embodiment, a "signal processing block for point image restoration processing" and a "signal processing block for arbitrary sharpness enhancement processing" are connected in series (cascaded), so that continuous signal strength adjustment can be performed by both the signal processing blocks. That is, the restoration processing section 38 and the outline enhancement processing section 39 are provided in series, and image data is subjected to one of the point image restoration processing and the sharpening processing (in the example shown in FIG. 5, "point image restoration processing") and is then subjected to the other processing (in the example shown in FIG. 5, "sharpening processing").

The restoration processing section 38 includes a point image restoration filter processing section 42, a restoration multiplier 43, and a restoration adder 44. The point image restoration filter processing section 42 calculates increment or decrement data of the image by applying a restoration filter corresponding to the point spread function of the optical system (lens 16 or the like) to input image data. The restoration multiplier 43 performs a multiplication of the increment or decrement data and a restoration strength magnification U by performing gain control of the increment or decrement data calculated by the point image restoration filter processing section 42. The restoration adder 44 adds the image data (input image) before being input to the point image restoration filter processing section 42 and the increment or decrement data after the multiplication of the restoration strength magnification U. The point image restoration processing is formed by a series of processes in the point image restoration filter processing section 42, the restoration multiplier 43, and the restoration adder 44.

In addition, the restoration processing section 38 can reflect the restoration strength magnification U in the image data using any method. In the present embodiment and other embodiments, instead of the method described above, other methods equivalent to the above method may be used. For example, image data (input image data+increment or decrement data) obtained by applying a restoration filter corresponding to the point spread function of the optical system (lens 16 or the like) to the input image data may be multiplied by the restoration strength magnification U while multiplying the input image data by the magnification (1−U), and both the results may be added together.

The outline enhancement processing section 39 includes an outline enhancement filter processing section 46, a sharpening multiplier 47, and a sharpening adder 48. In this example, image data after the point image restoration processing is input to the outline enhancement filter processing section 46 as input image data. The outline enhancement filter processing section 46 calculates increment or decrement data of the image by applying the sharpening filter (outline enhancement filter) to the input image data. The sharpening filter is determined according to any method. In the outline enhancement filter processing section 46, a single sharpening filter may be used, or a filter that is appropriately selected from a plurality of filters may be used as a sharpening filter. The sharpening multiplier 47 performs a multiplication of the increment or decrement data and a sharpening strength magnification V by performing gain control of the increment or decrement data calculated by the outline enhancement filter processing section 46. The sharpening adder 48 generates output image data by adding the image data before being input to the outline enhancement filter processing section 46 (point image data after image restoration processing) and the increment or decrement data after the multiplication of the sharpening strength magnification V. The sharpening processing is formed by a series of processes in the outline enhancement filter processing section 46, the sharpening multiplier 47, and the sharpening adder 48.

Similar to the method of reflecting the restoration strength magnification U, the outline enhancement processing section 39 can reflect the sharpening strength magnification V in the image data using any method. In the present embodiment and other embodiments, instead of the method described above, other methods equivalent to the above method may be used. For example, image data (input image data+increment or decrement data) obtained by applying a sharpening filter (outline enhancement filter) to the input image data may be multiplied by the sharpening strength magnification V while multiplying the input image data by the magnification (1−V), and both the results may be added together.

The sharpness restoration control section 37 includes an automatic strength adjustment section 52, a restoration filter selection section 53, and an outline enhancement strength selection section 54. The restoration filter selection section 53 selects a restoration filter X based on the point spread function of the optical system (lens 16 or the like) used in the imaging of image data, from a restoration filter storage unit 58, based on the imaging setting conditions S (a zoom stage, an F value, a subject distance, and the like). Then, the restoration filter selection section 53 transmits the selected restoration filter X to the automatic strength adjustment section 52 and the point image restoration filter processing section 42 of the restoration processing section 38. The point image restoration filter processing section 42 applies the restoration filter X transmitted from the restoration filter selection section 53 to the input image.

On the other hand, the outline enhancement strength selection section 54 selects a sharpening strength magnification (outline enhancement strength) V0 corresponding to the imaging setting conditions S from an outline enhancement strength list storage unit 60, and transmits the selected sharpening strength magnification V0 to the automatic strength adjustment section 52. In this example, the sharpening strength magnification V0 selected by the outline enhancement strength selection section 54 is the sharpening strength magnification in a case where the point image restoration processing is not substantially performed in the restoration processing section 38 (point image restoration filter processing section 42).

The "sharpening strength magnification in a case where the point image restoration processing is not substantially performed" corresponds to the total sharpness restoration rate (total sharpness restoration strength). That is, in this example, the point image restoration strength and the sharpening strength are determined by the total sharpness restoration strength (refer to FIG. 4), and the total sharpness restoration strength in a case where the point image restoration processing is not performed is determined only by the sharpening strength. Therefore, the outline enhancement strength selection section 54 in this example that acquires the sharpening strength magnification in a case where the point image restoration processing is not performed as the sharpening strength magnification V0 and supplies the sharpening strength magnification to the automatic strength adjustment section 52 substantially supplies the total sharpness restoration rate (total sharpness restoration strength) to the automatic strength adjustment section 52.

The restoration filter storage unit 58 stores a plurality of restoration filters based on the point spread function of a plurality of optical systems (lens 16 or the like) for each of the imaging setting conditions. The outline enhancement strength list storage unit 60 stores the outline enhancement strength for each of the imaging setting conditions. In particular, in this example, the sharpening strength magnification V0 (maximum outline enhancement strength) in a case where the point image restoration processing is OFF is stored in the outline enhancement strength list storage unit 60. The restoration filter storage unit 58 and the outline enhancement strength list storage unit 60 may be provided in the camera body 14, or may be provided in the lens unit 12.

The automatic strength adjustment section 52 determines the restoration strength magnification U and the sharpening strength magnification V corresponding to a point image restoration rate G based on the restoration filter X from the restoration filter selection section 53 and the sharpening strength magnification V0 from the outline enhancement strength selection section 54 (here, "restoration strength magnification U≥0" and "sharpening strength magnification V≥0" are satisfied). Then, the automatic strength adjustment section 52 transmits the determined restoration strength magnification U to the restoration multiplier 43, and transmits the sharpening strength magnification V to the sharpening multiplier 47. The restoration strength magnification U and the sharpening strength magnification V are strength adjustment parameters in the restoration processing section 38 and the outline enhancement processing section 39, respectively, and the restoration multiplier 43 and the sharpening multiplier 47 perform multiplication processing using the restoration strength magnification U and the sharpening strength magnification V that are transmitted from the automatic strength adjustment section 52.

In addition, the automatic strength adjustment section 52 acquires the frequency characteristics of a filter used in each of the point image restoration filter processing section 42 and the outline enhancement filter processing section 46. For example, the restoration filter X used in the point image restoration filter processing section 42 is transmitted to the automatic strength adjustment section 52 from the restoration filter selection section 53. The automatic strength adjustment section 52 also acquires a sharpening filter, which is used in the outline enhancement filter processing section 46, using any method. For example, in a case where the sharpening filter used in the outline enhancement filter processing section 46 is fixed, the automatic strength adjustment section 52 may acquire the frequency characteristics of the sharpening filter by storing the frequency characteristics of the sharpening filter in advance. In addition, a sharpening filter to be used may be transmitted to the automatic strength adjustment section 52 from the outline enhancement filter processing section 46, and the automatic strength adjustment section 52 may acquire the frequency characteristics of the sharpening filter by analyzing the received sharpening filter. When determining the restoration strength magnification U and the sharpening strength magnification V based on a total sharpness evaluation value to be described later, the automatic strength adjustment section 52 considers the frequency characteristics of filters used in the point image restoration filter processing section 42 and the outline enhancement filter processing section 46. Specifically, the automatic strength adjustment section 52 reflects the frequency characteristics of each filter in the total sharpness evaluation value, and determines the restoration strength magnification U and the sharpening strength magnification V based on the total sharpness evaluation value reflecting the frequency characteristics of the filter.

For example, the determination of the restoration strength magnification U and the sharpening strength magnification V in the automatic strength adjustment section 52 can be performed according to the following flow.

First, the imaging setting conditions S are acquired by the body controller 28, and the restoration filter X corresponding to the imaging setting conditions S is selected by the restoration filter selection section 53. In addition, the sharpening strength magnification V0 in a case where the point image restoration processing is OFF is selected according to the imaging setting conditions S by the outline enhancement strength selection section 54.

The restoration filter X is designed so as to minimize the degree of image degradation based on the PSF of the optical system (lens 16 or the like) corresponding to the imaging setting conditions S by the least squares criterion, and the ideal frequency characteristics of the restoration filter X can be designed by the Wiener filter characteristics. In this example, after the ideal frequency characteristics of the restoration filter X are determined, an FIR filter reflecting the frequency characteristics is determined as the restoration filter X. The restoration filter X may be any of a real space filter and a frequency space filter. In the case of forming the restoration filter X using a real space filter formed by a plurality of taps, it is preferable to set an FIR filter, which approximates best in a range in which the ideal frequency characteristics can be realized by the desired number of taps, as the restoration filter X. In general, since the shape of the PSF changes with the image height, it is desirable that the restoration filter X has different frequency characteristics according to the image height in the image. Accordingly, a set including a plurality of restoration filters determined according to the position in the image is referred to as a "restoration filter X" in a broad sense, and a restoration filter applied to the position (pixel) of the coordinates (i, j) in the image is denoted as "$X_{i,j}$".

As described above, the restoration filter X is determined based on the imaging setting conditions S in the imaging of image data. However, the imaging setting conditions S may include "setting conditions affecting the point spread function" and "imaging conditions that do not affect the point spread function". The "setting conditions" may include at least any one of diaphragm information (F value), zoom information (zoom magnification or the like), subject distance information, or lens type information of the optical system, for example. In addition, the "imaging conditions" may include at least any one of imaging sensitivity information (ISO sensitivity or the like) or imaging mode information.

The imaging setting conditions S can be input to the restoration filter selection section 53 and the outline enhancement strength selection section 54 using any method, and the imaging setting conditions S are appropriately transmitted to the restoration filter selection section 53 and the outline enhancement strength selection section 54 from a control processing unit (not shown) that manages the imaging setting conditions S of the device control unit 34 and the image processing unit 35 of the body controller 28.

On the other hand, the point image restoration rate G is designated in advance by the user before the image processing in the restoration processing section 38 and the outline enhancement processing section 39. The method of designating the point image restoration rate G by the user is not particularly limited. For example, it is possible to easily determine the point image restoration rate G by displaying adjustment means, such as a slider for designating the point image restoration rate G, on the user interface 29 (back display unit or the like) so that the user performs an operation through the adjustment means. The point image restoration rate G is basic data for controlling the restoration strength magnification U of the point image restoration processing by the restoration multiplier 43. As will be described later, for example, except for a case where the value of the point image restoration rate G is greater than a predetermined threshold value, the restoration strength magnification U and the point image restoration rate G are equal (restoration strength magnification U=point image restoration rate G). The case in which the point image restoration rate G is 0 (zero) corresponds to a case where the point image restoration processing is OFF. The restoration strength magnification U in the point image restoration processing may be changed to have consecutive values, or may be changed to have discrete values, or may be changed according to ON or OFF (according to whether or not the predetermined magnification is "0 (zero)"). Alternatively, it is possible to mount a processing circuit or the like that can change the restoration strength magnification U using any method.

The method of determining the point image restoration rate G is not limited to the designation of the user, and the point image restoration rate G may be calculated and determined based on any information. That is, the sharpness restoration control section 37 (automatic strength adjustment section 52) may determine the point image restoration rate G based on the designated restoration rate that is designated by the user, or the point image restoration rate G determined based on the optical characteristics information indicating the characteristics of the optical system may be used. The "optical characteristics information" referred to herein may include the type information of the lens 16 provided in the optical system, individual differences information of the optical system, and other imaging setting conditions. The point image restoration rate G itself in which the optical characteristics of the optical system are reflected may be included in the "optical characteristics information". The optical characteristics information is stored in an arbitrary storage unit. For example, the optical characteristics information may be stored in a storage unit (optical system storage unit) of the lens unit 12, or the optical characteristics information may be stored in a storage unit (main body storage unit) of the camera body 14. Accordingly, in the sharpness restoration control section 37 (body controller 28) or the like, the point image restoration rate G may be determined based on the optical characteristics information stored in a storage unit (an optical system storage unit, a main body storage unit).

In addition, the value of the point image restoration rate G may depend on the imaging setting conditions S, and the point image restoration rate G having a different value according to the imaging setting conditions S may be selected by the sharpness restoration control section 37 (body controller 28) or the like. In this case, for example, in order to suppress artifacts the degree of generation changes depending on the diaphragm value, the point image restoration rate G may be set to be relatively low intentionally in a specific diaphragm value (imaging setting conditions S).

Assuming that the frequency characteristics of a filter used in the outline enhancement filter processing section 46 (filter for extracting outline enhancement components in the sharpening processing) are "$\varphi(\omega_x, \omega_y)$", the frequency characteristics of a restoration filter $X_{i,j}$ (filter for extracting restoration components in the point image restoration processing) are set to "$x_{i,j}(\omega_x, \omega_y)$". In this case, the frequency characteristics of the entire image processing system shown in FIG. 5 in which the restoration processing section 38 and the outline enhancement processing section 39 (point image restoration processing and sharpening processing) are combined are expressed by the following Equation 1.

$$F(\omega_x, \omega_y | U, V, x_{i,j}) = [1 + U \times x_{i,j}(\omega_x, \omega_y)] \times [1 + V \times \varphi(\omega_x, \omega_y)] \quad \text{(Equation 1)}$$

"$F(\omega_x, \omega_y | U, V, x_{i,j})$" shows a function for $(\omega_x, \omega_y)$ (frequencies in the x and y directions) with the restoration strength magnification U, the sharpening strength magnification V, the frequency characteristics $x_{i,j}$ as parameters, and this function is determined depending on the configuration of the image processing system.

On the other hand, strength adjustment (determination of the restoration strength magnification U used in the restoration multiplier 43) in the point image restoration processing is performed so that the total sharpness evaluation value (total sharpness restoration rate) $C(U, V, x_{i,j})$ defined by the following Equation 2 is maintained at a fixed value.

$$C(U, V, x_{i,j}) = \sum_{i,j} \int\int w_{i,j}(\omega_x, \omega_y) F(\omega_x, \omega_y | U, V, x_{i,j}) d\omega_x d\omega_y \quad \text{(Equation 2)}$$

Here, "$w_{i,j}(\omega_x, \omega_y)$" is an arbitrary weighting function defined for each position (pixel position) (i, j) in the image, and the total sharpness evaluation value (total sharpness evaluation function) $C(U, V, x_{i,j})$ is defined by the weighted calculation of the frequency characteristics of the entire system. It is preferable that the weighting function $w_{i,j}(\omega_x, \omega_y)$ is designed to be visually significant frequency components and/or a large value at a position in an image. By using the total sharpness evaluation value $C(U, V, x_{i,j})$ defined by the above Equation 2, even if the strength of the point image restoration processing is changed, the degree of frequency enhancement in a target frequency band and/or a target position in an image is not changed. Accordingly, a large difference in sharpness does not occur. On the other hand, in a frequency band and/or a position in an image where the weighting function $w_{i,j}(\omega_x, \omega_y)$ is relatively small, the difference in image quality due to the point image restoration processing is likely to be noticeable.

Based on the above, the values of the restoration strength magnification U and the sharpening strength magnification V can be determined as follows. That is, based on the point image restoration rate G input to the automatic strength adjustment section 52, the value of the restoration strength magnification U is determined by the monotonically increasing function, and then the value of the sharpening strength magnification V is determined that the total sharpness evaluation value $C(U, V, x_{i,j})$ is maintained at a fixed value. Therefore, the automatic strength adjustment section 52 performs the adjustment so that the value of the sharpening strength magnification V decreases as the value of the restoration strength magnification U increases and the value of the sharpening strength magnification V increases as the value of the restoration strength magnification U decreases. However, if the value of the restoration strength magnification U is too large, the total sharpness evaluation value $C(U, V, x_{i,j})$ may not be maintained constant even in a case where the value of the sharpening strength magnification V is set to zero "0". That is, there may be a limitation on the range of the restoration strength magnification U in which the total sharpness evaluation value $C(U, V, x_{i,j})$ can be maintained constant.

If the upper limit of the restoration strength magnification U is denoted as "$U_{MAX}$", the maximum value of the restoration strength magnification U is limited as shown in the following Equation 3 so that the total sharpness evaluation value $C(U, V, x_{i,j})$ satisfies the relationship of "$C(U_{MAX}, 0, x_{i,j}) = C(0, V0, x_{i,j})$".

$$U = \begin{cases} G & (G \leq U_{MAX}) \\ U_{MAX} & \text{otherwise} \end{cases} \quad \text{(Equation 3)}$$

The above Equation 3 shows that the point image restoration rate G is set to the restoration strength magnification U (U=G) in a case where the point image restoration rate G is equal to or less than the upper limit $U_{MAX}$ of the restoration strength magnification U and the upper limit $U_{MAX}$ of the restoration strength magnification U is set to the restoration strength magnification U (U=$U_{MAX}$) in a case where the point image restoration rate G exceeds the upper limit $U_{MAX}$ of the restoration strength magnification U.

The value of the sharpening strength magnification V is calculated by finding the sharpening strength magnification V, at which the total sharpness evaluation value satisfies the relationship of "$C(U, V, x_{i,j}) = C(0, V0, x_{i,j})$", in the image processing system shown in FIG. 5. This is equivalent to finding the solution of the primary equation. Accordingly, the automatic strength adjustment section 52 can easily calculate the sharpening strength magnification V. The degree of difficulty of the calculation of the sharpening strength magnification V depends on the definition of the frequency characteristics $F(\omega_x, \omega_y|U, V, x_{i,j})$ of the entire system. In a case where the frequency characteristics $F(\omega_x, \omega_y|U, V, x_{i,j})$ become a non-linear function and it is difficult to find the sharpening strength magnification V that strictly satisfies the equation described above, formulation, such as adopting the sharpening strength magnification V that brings the total sharpness evaluation value $C(U, V, x_{i,j})$ closest to the total sharpness evaluation value $C(0, V0, x_{i,j})$, may be performed.

Through a series of processes described above, it is possible to calculate the restoration strength magnification U and the sharpening strength magnification V for maintaining the total sharpness evaluation value $C(U, V, x_{i,j})$ constant.

As described above, according to the present embodiment, the restoration strength magnification U and the sharpening strength magnification V are determined based on the total restoration sharpness (total sharpness evaluation value). Therefore, since a variation in the sharpness of an image (output image) subjected to the point image restoration processing and the sharpening processing is suppressed, it is possible to stabilize the overall resolution or the image quality in the output image.

In particular, by determining the total sharpness evaluation value so that the weighting in a visually main frequency band and/or a position in an image increases, the restoration strength and the sharpening strength are fixed in the visually main frequency band and/or the position in the image. Therefore, it is possible to prevent the sharpness difference from becoming excessive.

In addition, although accurate image restoration processing corresponding to the PSF of the optical system can be realized through the point image restoration processing, artifacts are likely to be generated depending on the imaging scene or the imaging conditions, and the degree of influence on the image quality is high. Therefore, by setting the restoration strength magnification U (restoration rate) of the point image restoration processing preferentially as in the present embodiment, it is possible to effectively improve the overall resolution or image quality. For example, by setting the restoration rate (the point image restoration rate G, the restoration strength magnification U) to be low, it is possible to make artifacts (ringing or the like), which are generated depending on the imaging scene or the like, not noticeable, and it is possible to improve the sharpness by the sharpening processing.

In addition, for the control of the strength adjustment parameter in two image processes (point image restoration processing and sharpening processing), control of "two variables (restoration strength, sharpening strength)" is generally required, and the degree of freedom of the control is set to "2". However, according to the strength adjustment processing according to the present embodiment, the degree of freedom of required control is "1". Therefore, it is possible to determine the appropriate restoration strength and sharpening strength (the restoration strength magnification U and the sharpening strength magnification V) just by determining the point image restoration rate G.

Second Embodiment

A sharpness restoration control section 37 according to the present embodiment acquires a sharpening rate in the sharpening processing, and calculates a "restoration rate" in the point image restoration processing based on the total sharpness restoration rate and the sharpening rate.

Figure 6:
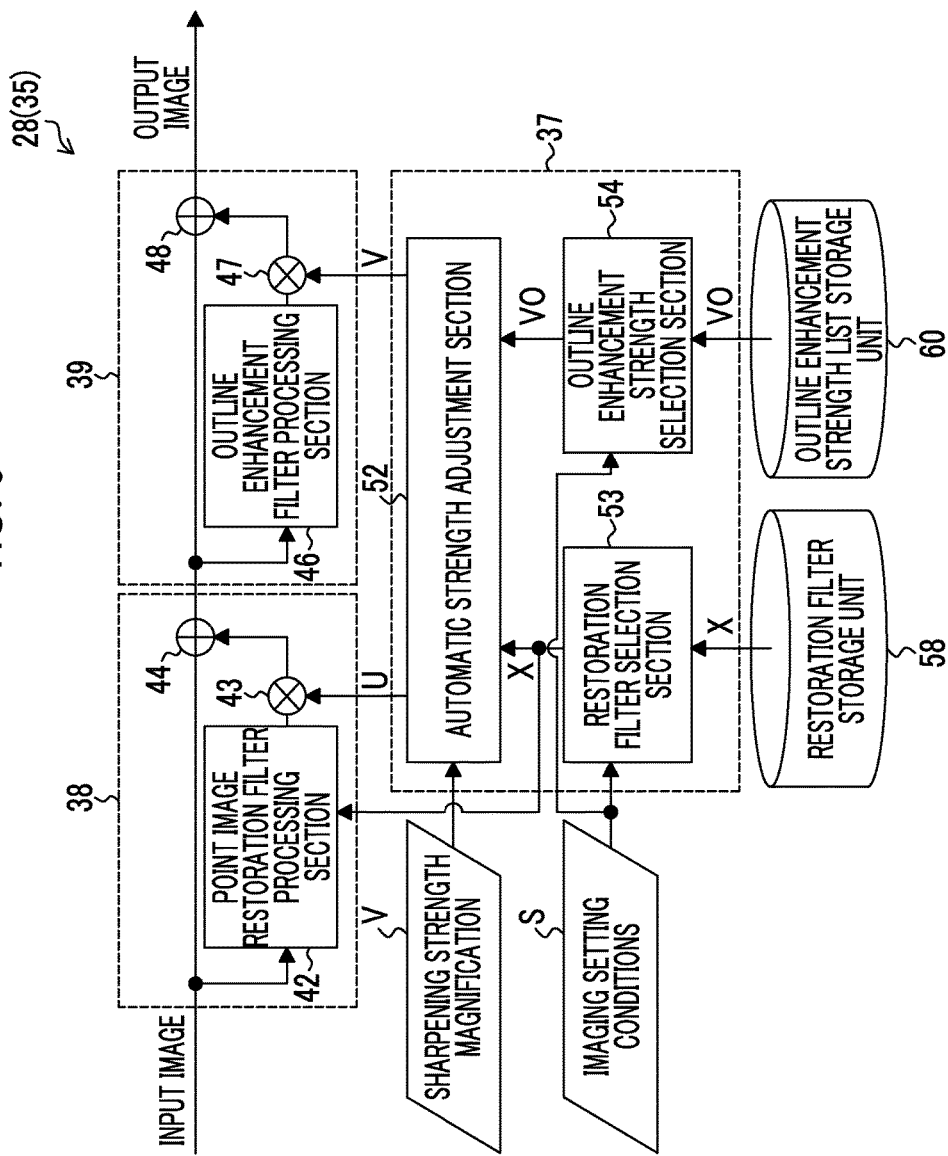
FIG. 6 is a diagram showing the configuration of a processing block that performs point image restoration processing and sharpening processing according to a second embodiment.

FIG. 6 is a diagram showing the configuration of a processing block that performs point image restoration processing and sharpening processing according to a second embodiment.

In the present embodiment, the same reference numerals are given to the same components as in the first embodiment shown in FIG. 5, and the detailed explanation thereof will be omitted.

The sharpening rate (sharpening strength magnification V) is input to the sharpness restoration control section 37 (automatic strength adjustment section 52) of the present embodiment. The sharpening strength magnification V input to the automatic strength adjustment section 52 is designated in advance by the user before the image processing in the restoration processing section 38 and the outline enhancement processing section 39. The method of designating the sharpening strength magnification V by the user is not particularly limited. For example, it is possible to easily determine the sharpening strength magnification V by displaying adjustment means, such as a slider for designating the sharpening strength magnification V, on the user interface 29 (back display unit or the like) so that the user performs an operation through the adjustment means. The sharpening strength magnification V input to the automatic strength adjustment section 52 is basic data for controlling the sharpening strength magnification V of the sharpening processing by the sharpening multiplier 47. Except for a case where the value of the sharpening strength magnification V input to the automatic strength adjustment section 52 is greater than a predetermined threshold value, the sharpening strength magnification V input to the automatic strength adjustment section 52 and the sharpening strength magnification V used in the sharpening multiplier 47 are equal. The case in which the sharpening strength magnification V is 0 (zero) corresponds to a case where the sharpening processing is OFF. The sharpening strength magnification V in this sharpening processing may be changed to have consecutive values, or may be changed to have discrete values, or may be changed according to ON or OFF (according to whether or not the predetermined magnification is "0 (zero)"). Alternatively, it is possible to mount a processing circuit or the like that can change the sharpening strength magnification V using any method.

In the first embodiment described above, processing of "determining the restoration strength magnification U of the point image restoration processing block first and then calculating the sharpening strength magnification V of the sharpening processing block so that the total sharpness evaluation value $C(U, V, x_{i,j})$ is the same" is performed. On the other hand, in the present embodiment, processing of "determining the sharpening strength magnification V of the sharpening processing block first and then determining the restoration strength magnification U of the point image restoration processing block so that the total sharpness evaluation value $C(U, V, x_{i,j})$ is the same" is performed.

The sharpening strength magnification V0 in a case where the point image restoration processing is OFF is selected from the sharpening strength magnification V0 stored in the outline enhancement strength list storage unit 60, and is transmitted to the automatic strength adjustment section 52 from the outline enhancement strength selection section 54.

The automatic strength adjustment section 52 calculates the restoration strength magnification U that matches the total sharpness evaluation value $C(0, V0, x_{i,j})$ based on the sharpening strength magnification V0 in a case where the point image restoration processing is OFF with the total sharpness evaluation value $C(U, V, x_{i,j})$ based on the sharpening strength magnification V used in the sharpening multiplier 47. The restoration strength magnification U is calculated by finding the restoration strength magnification U at which the total sharpness evaluation value satisfies the relationship of "$C(U, V, x_{i,j})=C(0, V0, x_{i,j})$", and this is equivalent to finding the solution of the primary equation. In a case where it is difficult to find the restoration strength magnification U satisfying the equation described above, formulation, such as adopting the restoration strength magnification U that brings the total sharpness evaluation value $C(U, V, x_{i,j})$ closest to the total sharpness evaluation value $C(0, V0, x_{i,j})$, may be performed.

Through a series of processes described above, it is possible to calculate the restoration strength magnification U and the sharpening strength magnification V for maintaining the total sharpness evaluation value $C(U, V, x_{i,j})$ constant.

Other configurations are the same as those in the first embodiment shown in FIG. 5.

As described above, also in the present embodiment, the restoration strength magnification U and the sharpening strength magnification V are calculated based on the total restoration sharpness (total sharpness evaluation value). Therefore, since a variation in the sharpness of an output image after the point image restoration processing and the sharpening processing is suppressed, it is possible to stabilize the overall resolution or the image quality.

In particular, the sharpening processing (outline enhancement processing) is stable image processing with little adverse effects compared with the point image restoration processing. Therefore, for example, in a case where a user desires an image with less adverse effects, such as an image with less artifacts, in a case where the effect of the point image restoration processing is hardly noticeable, and in a case where the adverse effects of the point image restoration processing are likely to be noticeable, it is preferable to set the sharpening strength magnification V preferentially as in the present embodiment. In addition, in a case where the optical performance of the lens 16 used in the imaging is good and the influence of the point spread phenomenon of the optical system is very small and in a case where the effect of the point image restoration processing is inherently difficult to realize, such as a case where the imaging mode determined based on the imaging scene is a night view mode, a portrait mode, or an art filter mode, it is preferable to set the sharpening strength magnification V preferentially as in the present embodiment.

There is a "case in which there is a limitation on the sharpening strength but there is no limitation on the point image restoration strength", such as a case where the sharpening strength cannot be increased to a certain level since non-linear processing (clipping processing, limiter processing, or the like) to be described later is included in the sharpening processing block. In this case, control for making the total sharpness evaluation value $C(U, V, x_{i,j})$ constant may become easier by determining the sharpening strength magnification V preferentially as in the present embodiment.

Third Embodiment

The sharpness restoration control section 37 according to the present embodiment calculates the restoration strength magnification U and the sharpening strength magnification V by adjusting the total sharpness restoration rate to the target sharpness restoration at a specific frequency (first frequency).

In the present embodiment, the same reference numerals are given to the same components as in the first embodiment shown in FIG. 5, and the detailed explanation thereof will be omitted.

Figure 7:
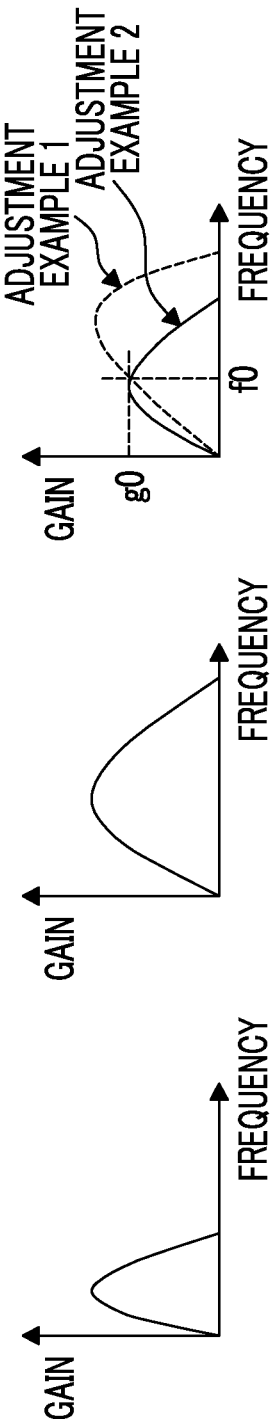
FIGS. 7A to 7C are diagrams illustrating the frequency characteristics of image processing, where

FIGS. 7A to 7C are diagrams illustrating the frequency characteristics of image processing, where FIG. 7A shows an example of the "frequency-gain" relationship in the sharpening processing (outline enhancement filter processing section 46), FIG. 7B shows an example of the "frequency-gain" relationship in the point image restoration processing (point image restoration filter processing section 42), and FIG. 7C shows an example of the "frequency-gain" relationship in the entire sharpening processing and point image restoration processing.

In the image processing of the present embodiment, a part of the image processing according to the first embodiment described above is simplified. Focusing on a specific frequency and/or a specific position (screen coordinates) in an image, the "restoration strength magnification U and sharpening strength magnification V" are pinpoint-adjusted for the target frequency and/or the target position (target coordinates).

The target frequency and the target position referred to herein are not particularly limited. For example, a frequency and screen coordinates that are significant in terms of visual characteristics can be set to the target frequency and the target position. For example, the frequency and the screen coordinates that are significant in terms of visual characteristics may be set so as to be focused on the center position of the image. In addition, the range of the target frequency and the range of the target position are not limited, and a single target frequency or a single target position may be present or a plurality of target frequencies or a plurality of target positions may be present.

Specifically, this image processing can be realized by defining the weighting function $w_{i,j}(\omega_x, \omega_y)$ of the equation (refer to "Equation 2") of the total sharpness evaluation value $C(U, V, x_{i,j})$ as follows.

$$w_{i,j}(\omega_x, \omega_y) = \delta(\omega_x - \omega_0) \times \delta(\omega_y) \times \delta(i - i_0) \times \delta(j - j_0) \quad \text{(Equation 4)}$$

In the above equation, "$\delta(x)$" indicates a Kronecker's delta function, and the coordinates (image height) of the target position of the image is assumed to be "$i=i_0, j=j_0$". For example, assuming that the target position of the image is the center position of the image, the weighting function $w_{i,j}(\omega_x, \omega_y)$ in the above Equation 4 is defined so as to obtain a specific gain g0 (total sharpness evaluation value $C(U, V, x_{i,j})$) at a specific frequency f0 at the image center. In the above Equation 4, for the frequency, only a frequency in the x direction is referred to. This is because the shape of the PSF is isotropic at the image center and the frequency characteristics of the restoration filter based on the isotropic PSF are also isotropic and accordingly, it is sufficient to refer to frequencies in a specific direction ("x direction" in the above Equation 4).

By using the weighting function expressed by the above Equation 4, as shown in FIGS. 7A to 7C, the gain g0 at the specific frequency f0 is always fixed in the frequency characteristics of the entire image processing system even if the point image restoration rate G is any value.

The frequency characteristics of the entire point image restoration processing (restoration processing section 38) are determined by the filter processing of the point image restoration filter processing section 42 and the gain control processing of the restoration multiplier 43, and are determined by adjusting the magnification of the frequency characteristics (refer to FIG. 7A) of the point image restoration filter processing section 42 based on the restoration strength magnification U. Similarly, the frequency characteristics of the entire sharpening processing (outline enhancement processing section 39) are determined by the filter processing of the outline enhancement filter processing section 46 and the gain control processing of the sharpening multiplier 47, and are determined by adjusting the magnification of the frequency characteristics (refer to FIG. 7B) of the outline enhancement filter processing section 46 based on the sharpening strength magnification V. Therefore, the frequency characteristics (refer to FIG. 7C) of the entire image processing system can be adjusted by controlling the restoration strength magnification U and the sharpening strength magnification V that are applied to the frequency characteristics (refer to FIGS. 7A and 7B) of the point image restoration filter processing section 42 and the outline enhancement filter processing section 46.

In the adjustment of the restoration strength magnification U and the sharpening strength magnification V in the automatic strength adjustment section 52, there is a limitation that the specific gain g0 is realized at the specific frequency f0, but the number of specific adjustment examples is not determined to be one. For example, in a case where it is necessary to emphasize high frequency components of the image, the restoration strength magnification U and the sharpening strength magnification V are determined so as to obtain a gain that emphasizes the high frequency components as shown in the "adjustment example 1" of FIG. 7C. On the other hand, in a case where it is necessary to emphasize low to medium frequency components without emphasizing the high frequency components of the image, the restoration strength magnification U and the sharpening strength magnification V at which a gain is applied only to the low to medium frequency components are determined as shown in the "adjustment example 2" of FIG. 7C.

The restoration filter X used in the point image restoration filter processing section 42 is input to the automatic strength adjustment section 52 from the restoration filter selection section 53, and the automatic strength adjustment section 52 obtains the frequency characteristics of the restoration filter X. The automatic strength adjustment section 52 also checks the frequency characteristics of the sharpening filter used in the outline enhancement filter processing section 46. For example, in a case where a single sharpening filter is used in the outline enhancement filter processing section 46, the restoration filter selection section 53 may store the frequency characteristics of the sharpening filter in advance. In a case where a sharpening filter used in the outline enhancement filter processing section 46 is selected from a plurality of filters, the selected sharpening filter may be input to the automatic strength adjustment section 52 and the automatic strength adjustment section 52 may obtain the frequency characteristics of the sharpening filter, or the frequency characteristics of the selected sharpening filter may be input to the automatic strength adjustment section 52.

Other configurations are the same as those in the first embodiment shown in FIG. 5.

As described above, according to the present embodiment, it is possible to stabilize the image quality by suppressing the variation in the sharpness in the output image after the point image restoration processing and the sharpening processing.

In particular, since the gain g0 at the specific frequency f0 is fixed, it is possible to use a method of "adjusting the sharpness of high frequencies while maintaining the sharpness of low frequencies as a base constant", for example. Therefore, it is possible to flexibly control the frequency characteristics of the entire image processing.

In addition, it is also possible to determine the restoration strength magnification U and the sharpening strength magnification V so as to obtain the fixed total sharpness evaluation value $C(U, V, x_{i,j})$ at a specific position (for example, a center position) in the image. In a case where the center position is a "specific position", it is also possible to perform the point image restoration processing and the sharpening processing for improving the sharpness greatly for a blurred image near the image while preventing a large difference in sharpness from occurring in the image center that the user recognizes easily. The number of "specific positions" referred to herein is not particularly limited, and the number corresponding to several to tens of percents of the number of pixels that form the entire image can also be set to the number of "specific positions".

Fourth Embodiment

The restoration processing section 38 and the outline enhancement processing section 39 according to the present embodiment are provided in juxtaposition. Image data (input image) is input to each of the restoration processing section 38 and the outline enhancement processing section 39, and increment or decrement data of the image data due to the point image restoration processing and increment or decrement data of the image data due to the sharpening processing are added together to generate an output image.

Figure 8:
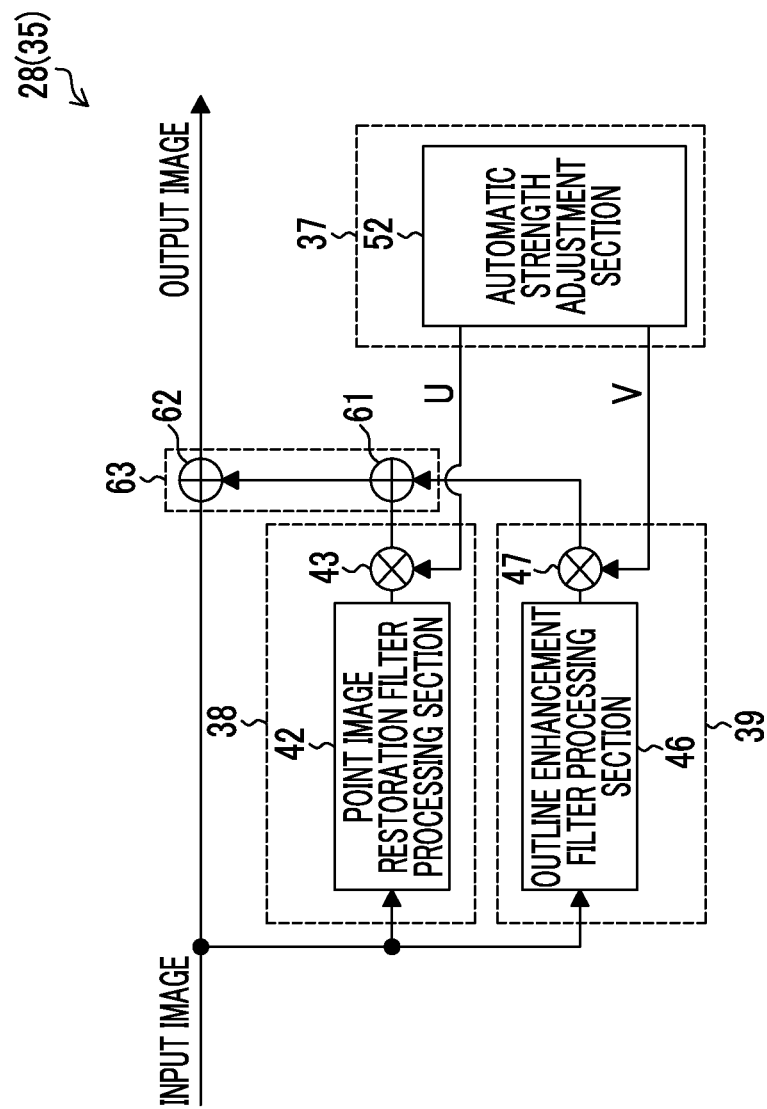
FIG. 8 is a diagram showing the configuration of a processing block that performs point image restoration processing and sharpening processing according to a fourth embodiment.

FIG. 8 is a diagram showing the configuration of a processing block that performs point image restoration processing and sharpening processing according to a fourth embodiment.

In the present embodiment, the same reference numerals are given to the same components as in the first embodiment shown in FIG. 5, and the detailed explanation thereof will be omitted.

The image processing unit 35 of the present embodiment includes a sharpness restoration adjusting section 63. The sharpness restoration adjusting section 63 includes a first adder 61 that adds the increment or decrement data of the image data from the restoration processing section 38 and the increment or decrement data of the image data from the outline enhancement processing section 39 and a second adder 62 that adds the increment or decrement data after the addition, which is output from the first adder 61, and the input image data.

That is, in this example, "point image restoration processing of the point image restoration filter processing section 42 and the restoration multiplier 43" and "sharpening processing of the outline enhancement filter processing section 46 and the sharpening multiplier 47" are performed in parallel for image data, and increment or decrement data corresponding to a value of difference from the image data (input image) is calculated in each processing. The increment or decrement data of the image data due to the point image restoration processing and the increment or decrement data of the image data due to the sharpening processing are added together by the first adder 61. As a result, increment or decrement data of the image data due to the entire point image restoration processing and sharpening processing is calculated. The "increment or decrement data of the image data due to the entire processing" and image data (input image) are added together by the second adder 62. As a result, image data (output image) subjected to the point image restoration processing and the sharpening processing is generated.

Other configurations are the same as those in the first embodiment shown in FIG. 5. For example, a restoration filter selected by the restoration filter selection section 53 (refer to FIG. 5) is supplied to the point image restoration filter processing section 42 and the automatic strength adjustment section 52, and the sharpening strength magnification V0 selected by the outline enhancement strength selection section 54 is supplied to the automatic strength adjustment section 52. The restoration strength magnification U and the sharpening strength magnification V used in the restoration multiplier 43 and the sharpening multiplier 47 are appropriately determined by the automatic strength adjustment section 52.

The frequency characteristics of the entire image processing system in this example are expressed by the following Equation 5.

$$F(\omega_x, \omega_y | U, V, x_{i,j}) = 1 + U \times x_{i,j}(\omega_x, \omega_y) + V \times \varphi(\omega_x, \omega_y) \quad \text{(Equation 5)}$$

In the above Equation 5, the frequency characteristics of the restoration processing section 38 are expressed by "$U \times x_{i,j}(\omega_x, \omega_y)$", and the frequency characteristics of the outline enhancement processing section 39 are expressed by "$V \times \varphi(\omega_x, \omega_y)$". Accordingly, the addition processing of the first adder 61 is based on the frequency characteristics of "$U \times x_{i,j}(\omega_x, \omega_y) + V \times \varphi(\omega_x, \omega_y)$", and the addition processing of the second adder 62 is based on the frequency characteristics of "$1 + U \times x_{i,j}(\omega_x, \omega_y) + V \times \varphi(\omega_x, \omega_y)$".

As described above, also in the present embodiment, in the same manner as in the case in which the restoration processing section 38 and the outline enhancement processing section 39 are disposed in series (refer to the first embodiment (FIG. 5) described above), a variation in the sharpness in the output image after the point image restoration processing and the sharpening processing is suppressed. Therefore, it is possible to stabilize the image quality.

Fifth Embodiment

The image processing unit 35 according to the present embodiment further includes a non-linear processing section that performs non-linear processing of image data, and non-linear processing is introduced in a two-stage filter processing system (the restoration processing section 38 and the outline enhancement processing section 39). Although the non-linear processing section is included in at least any one of the restoration processing section 38 or the outline enhancement processing section 39, an example in which the non-linear processing section is provided in the restoration processing section 38 will be described below.

In general, the non-linear processing may include not only arithmetic processing of addition, subtraction, multiplication, and division but also processing including the reference of a look-up table (LUT) or conditional branching, for example. Non-linear processing is often performed in order to suppress artifacts or noise. For example, "clipping processing for adjusting the pixel value exceeding the clip threshold value among image signals to the clip threshold value" may be performed as non-linear processing.

Figure 9:
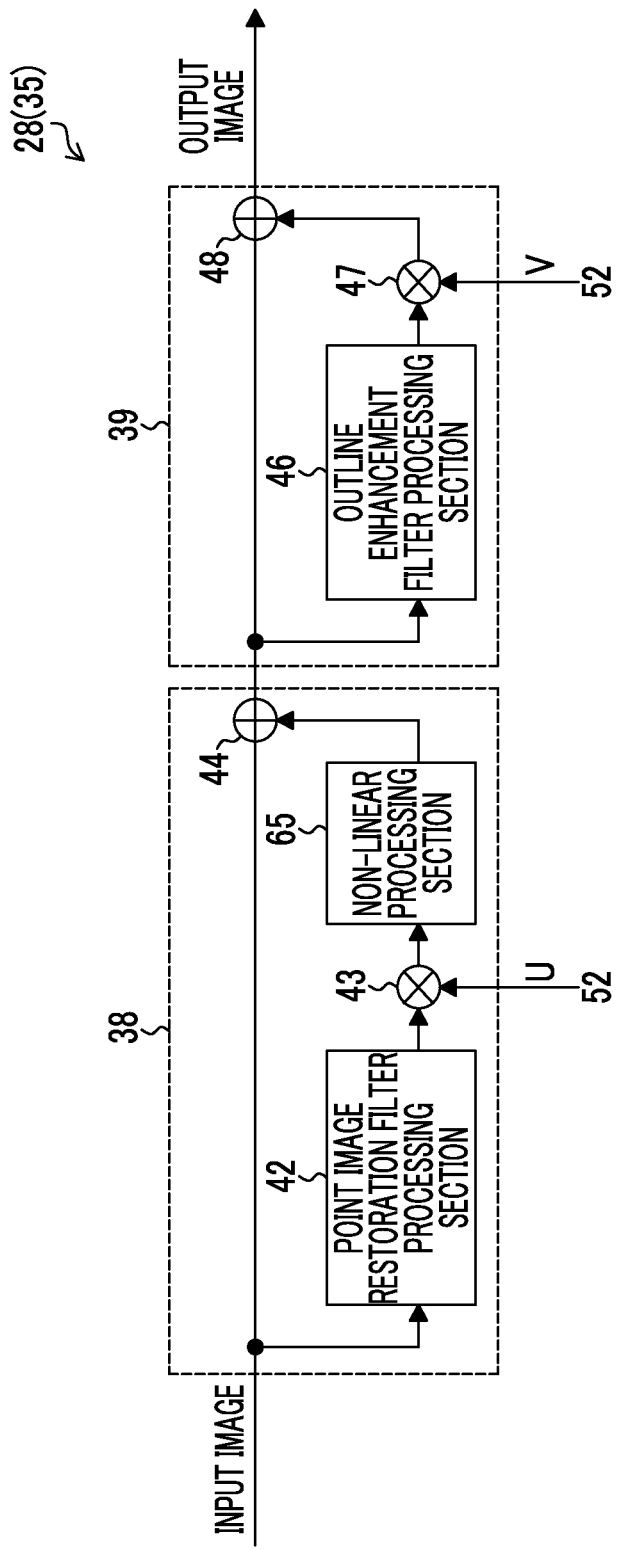
FIG. 9 is a diagram showing the configuration of a processing block that performs point image restoration processing and sharpening processing according to a fifth embodiment.

FIG. 9 is a diagram showing the configuration of a processing block that performs point image restoration processing and sharpening processing according to a fifth embodiment.

In the present embodiment, the same reference numerals are given to the same components as in the first embodiment shown in FIG. 5, and the detailed explanation thereof will be omitted.

The point image restoration processing (restoration processing section 38) in this example includes a series of processes, such as application of the enhancement magnification to the point image restoration enhancement component extracted by the restoration filter, application of non-linear processing to the point image restoration enhancement component after the application of the enhancement magnification, and combination of the point image restoration enhancement component after the non-linear processing and the original image.

That is, image data (input image) is input to the point image restoration filter processing section 42, filter processing using a restoration filter is performed, and increment or decrement data of the image data due to the point image restoration processing is calculated. The increment or decrement data is input to the restoration multiplier 43 and gain control based on the restoration strength magnification U is performed, the multiplication of the increment or decrement data and the restoration strength magnification U is performed, and increment or decrement data after the multiplication is input to a non-linear processing section 65.

In the non-linear processing section 65, clipping processing (non-linear processing) on the input increment or decrement data is performed, so that a pixel value exceeding a predetermined clip threshold value among the pieces of increment or decrement data (image data) is adjusted to the clip threshold value. The clip threshold value may be determined in advance and be stored in the non-linear processing section 65, or the user may designate the clip threshold value directly or indirectly through the user interface 29. Increment or decrement data of the image data after the clipping processing is added to the image data (input image) by the restoration adder 44 before being input to the point image restoration filter processing section 42. As a result, image data after the point image restoration processing is calculated.

The clipping processing performed in the non-linear processing section 65 is processing for limiting the image data so as not to take a value equal to or greater than a clip threshold value θ (≥0), as shown in the following Equation 6.

$$\text{CLIP}(x) = \begin{cases} x & (|x| < \theta) \\ \text{sign}(x) \times \theta & (|x| \geq \theta) \end{cases} \quad \text{[Equation 6]}$$

According to a clipping processing function CLIP(x) expressed by the above Equation 6, in a case where the absolute value of image data (pixel data) x is smaller than the clip threshold value θ (|x|<θ), the image data is maintained without being adjusted by the clipping processing, and "x" is output from the non-linear processing section 65. On the other hand, in a case where the absolute value of the image data x is equal to or greater than the clip threshold value θ (|x|≥θ), the signal component is adjusted by the clipping processing using a signum function), and "sign(x)× θ" is output from the non-linear processing section 65.

Other configurations are the same as those in the first embodiment shown in FIG. 5. For example, filter processing of the outline enhancement filter processing section 46 in the outline enhancement processing section 39, multiplication processing of the sharpening multiplier 47, and addition processing of the sharpening adder 48 are performed in the same manner as in the first embodiment described above.

In this example, as frequency characteristics $F(\omega_x, \omega_y|U, V, x_{i,j})$ in the entire system, it is possible to use frequency characteristics obtained approximately based on the output in a case where a specific input waveform is input to the system (image processing unit 35). That is, in a case where an image processing unit that performs non-linear processing is present in a signal processing system, it is theoretically impossible to calculate the frequency characteristics of the signal processing system accurately, and automatic calculation processing of the restoration strength magnification U and the sharpening strength magnification V may not be able to be applied. Accordingly, in the case in which non-linear processing is performed, processing for automatically calculating the restoration strength magnification U and the sharpening strength magnification V may be performed by approximately evaluating the internal frequency characteristics from the output waveform (output image data) for a specific input waveform (input image data) whose frequency components are grasped in advance and by using the frequency characteristics obtained by the approximate evaluation. In this case, since it is necessary to calculate the frequency characteristics $F(\omega_x, \omega_y|U, V, x_{i,j})$ of the entire system, it is necessary to express the frequency response approximation of the system for a specific input waveform using an expression. A specific approximation evaluation method is arbitrary, and the accuracy of the frequency response approximation of the system depends on the specific content of the non-linear processing.

As an example of the frequency response approximation of the system, in the image processing system including the clipping processing shown in FIG. 9, in a case where an input waveform (image signal) whose characteristics are grasped in advance is used, the input waveform is assumed to be a high contrast step function, and $w_{i,j}(\omega_x, \omega_y)$ is defined so as to have a specific value (total sharpness evaluation value) at the specific frequency f0 as in the above-described embodiment (refer to the above "Equation 4"), the present inventors have empirically learned that the frequency characteristics of the entire image processing system can be approximately expressed by the following Equation 7.

$$F(\omega_x,\omega_y|U,V)=[1+\min(U\times\psi(\omega_x,\omega_y),A)]\times[1+V\times\varphi(\omega_x,\omega_y)]$$ [Equation 7]

In the above Equation 7, "A" is a constant depending on the clip threshold value θ and the sharpness (degree of blurring) of the input image signal. In addition, "min($U\times\psi(\omega_x, \omega_y)$, A)" is a function showing the smaller one of "$U\times\psi(\omega_x, \omega_y)$" and "A".

Although the non-linear processing section 65 is provided in the restoration processing section 38 in this example, the non-linear processing section may be provided only in the outline enhancement processing section 39, or may be provided in both of the restoration processing section 38 and the outline enhancement processing section 39. However, if the non-linear processing is performed in both of the restoration processing section 38 and the outline enhancement processing section 39, the frequency response approximation of the entire image processing system becomes complicated. Accordingly, there is a possibility that control to determine the restoration strength magnification U and the sharpening strength magnification V while maintaining the total sharpness evaluation value $C(U, V, x_{i,j})$ at a fixed value will become difficult.

The restoration filter used in the point image restoration processing (point image restoration filter processing section 42) is designed on the assumption that an input image has expected frequency characteristics (blur characteristics). However, due to the non-linear phenomenon and signal processing in the imaging system or the image processing system disposed beforehand the point image restoration processing and the sharpening processing, image data (input image) may have different frequency characteristics (incorrect frequency characteristics) from the expected frequency characteristics. In this case, artifacts may be generated in the output image. In order to suppress such artifacts, it is preferable to provide the non-linear processing section 65 after filter processing (point image restoration filter processing section 42) using a restoration filter.

As described above, according to the present embodiment, even in a case where non-linear processing is performed by the restoration processing section 38 and/or the outline enhancement processing section 39, it is possible to accurately calculate the restoration strength magnification U and the sharpening strength magnification V. In particular, it is possible to effectively suppress artifacts by performing the non-linear processing.

Sixth Embodiment

In a conventional video imaging mode, the imaging setting conditions change with time during video imaging. Accordingly, if the point image restoration processing is performed by sequentially selecting the restoration filter corresponding to the changed imaging setting conditions, there is a possibility that a variation in the restoration rate or the image sharpness between motion picture frames will be noticeable.

In the present embodiment, in order to prevent the variation in the restoration rate or the sharpness between motion picture frames, control of the point image restoration processing strength and the sharpening processing strength is performed while maintaining the total sharpness evaluation value at a predetermined value during motion picture recording. That is, in the present embodiment, the total sharpness evaluation value is not changed for each of the imaging setting conditions.

Figure 10:
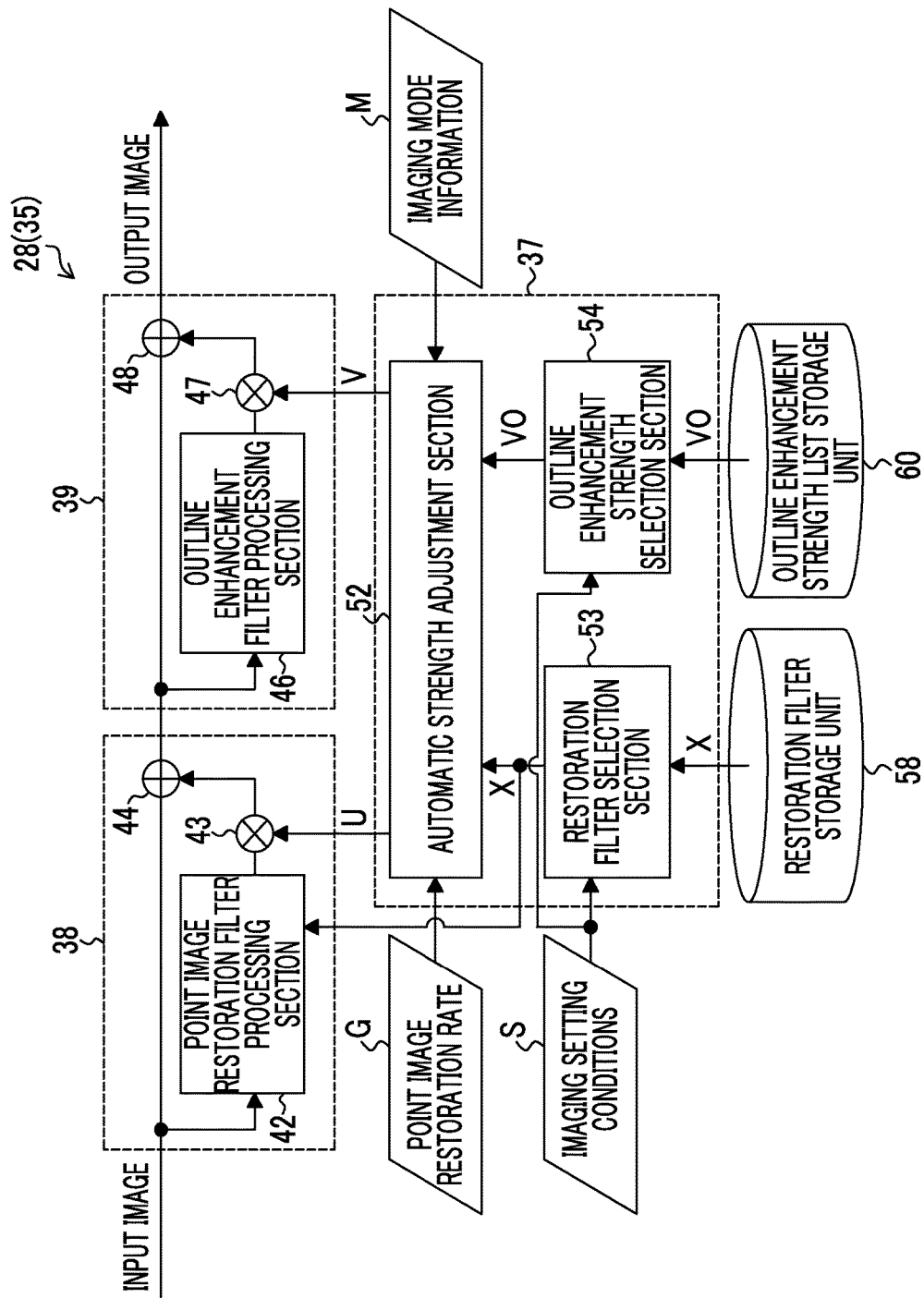
FIG. 10 is a diagram showing the configuration of a processing block that performs point image restoration processing and sharpening processing according to a sixth embodiment.

FIG. 10 is a diagram showing the configuration of a processing block that performs point image restoration processing and sharpening processing according to a sixth embodiment.

The sharpness restoration control section 37 (automatic strength adjustment section 52) according to the present embodiment acquires imaging mode information M when acquiring image data (input image), and maintains the total sharpness restoration rate constant in a case where the imaging mode information M indicates a motion picture recording mode. The "maintain the total sharpness restoration rate constant" is not limited to a case where the total sharpness restoration rate is maintained at a predetermined value, and includes a case where the total sharpness restoration rate is maintained in a range not affecting the image quality. In a case where the total sharpness restoration rate is maintained in the range not affecting the image quality, the degree of variation in the total sharpness restoration rate is preferably 10% or less, and more preferably 5% or less.

The imaging mode information M is input to the automatic strength adjustment section 52 using any method. For example, in a case where a "mode switching unit (user interface 29) capable of performing switching between the motion picture recording mode and the still image recording mode" is provided in the digital camera 10 (the lens unit 12, the camera body 14), the imaging mode information M selected by the user may be transmitted from the mode switching unit to the body controller 28 (automatic strength adjustment section 52). The imaging mode information M may be information indicating directly or indirectly whether or not an image to be processed is a motion picture or a still image, or information indicating "motion picture/still image" that is included in the image to be processed may be used as the imaging mode information M.

In a case where the input imaging mode information M indicates a motion picture recording mode, the automatic strength adjustment section 52 determines the restoration strength magnification U and the sharpening strength magnification V using a common total sharpness evaluation value (total sharpness restoration rate) among a plurality of pieces of image data (frames) that form a motion picture. That is, in the case of determining the restoration strength magnification U and the sharpening strength magnification V for a moving image (frames) captured in the motion picture recording mode, the total sharpness evaluation value (total sharpness restoration rate) is fixed without being changed for each of the imaging setting conditions even if the imaging setting conditions are changed between frames. The total sharpness evaluation value (total sharpness restoration rate) that is always used for the moving image can be determined using any method. For example, a total sharpness evaluation value (total sharpness restoration rate) corresponding to the imaging setting conditions of the specific frame (for example, an initial frame) that forms a motion picture may be used.

In a case where the imaging mode information M indicates the motion picture recording mode, the automatic strength adjustment section 52 (sharpness restoration control section 37) may set the restoration strength magnification U (restoration rate) of the point image restoration processing to be smaller than that in a case where the imaging mode information M indicates the still image recording mode. The point image restoration processing of the restoration processing section 38 is image restoration processing based on the PSF, and is excellent image quality improvement processing capable of effectively improving the image quality in a case where it is possible to accurately grasp the PSF, but is processing that can cause the degradation of image quality by overcorrection in a case where it is not possible to accurately grasp the PSF. Although a time corresponding to the point image restoration processing using a restoration filter that faithfully reflects the PSF, processing a plurality of frame images that form a motion picture within the limited time is also required in the motion picture recording mode. In addition, since it is also required to maintain the continuity between frames in the motion picture, it is not necessarily desirable that the image quality is significantly changed between consecutive frames. Therefore, in the motion picture recording mode, by making the restoration strength magnification U (restoration rate) relatively small in order to reduce the degradation of image quality due to overcorrection or the like or the change between frames, it is possible to generate an overall good motion picture. In addition, since the reduction in the restoration strength magnification U is compensated for by the sharpening strength magnification V, it is possible to obtain a clear motion picture by the sharpening processing even if the degree of restoration by the point image restoration processing is relatively small.

Other configurations are the same as those in the first embodiment shown in FIG. 5.

As described above, according to the present embodiment, even in a case where the imaging setting conditions are changed during video imaging and the restoration rate of the point image restoration processing corresponding to imaging setting conditions is changed, it is possible to suppress a variation in the sharpness of a restored motion picture since the total sharpness evaluation value (total sharpness restoration rate) is fixed.

Seventh Embodiment

In the present embodiment, the point image restoration rate G reflecting the individual differences information of the lens unit 12 that forms an optical system mounted in the camera body 14 is input to the automatic strength adjustment section 52. Accordingly, the automatic strength adjustment section 52 determines the restoration strength magnification U based on the optical characteristics information including the individual differences information of the optical system.

Figure 11:
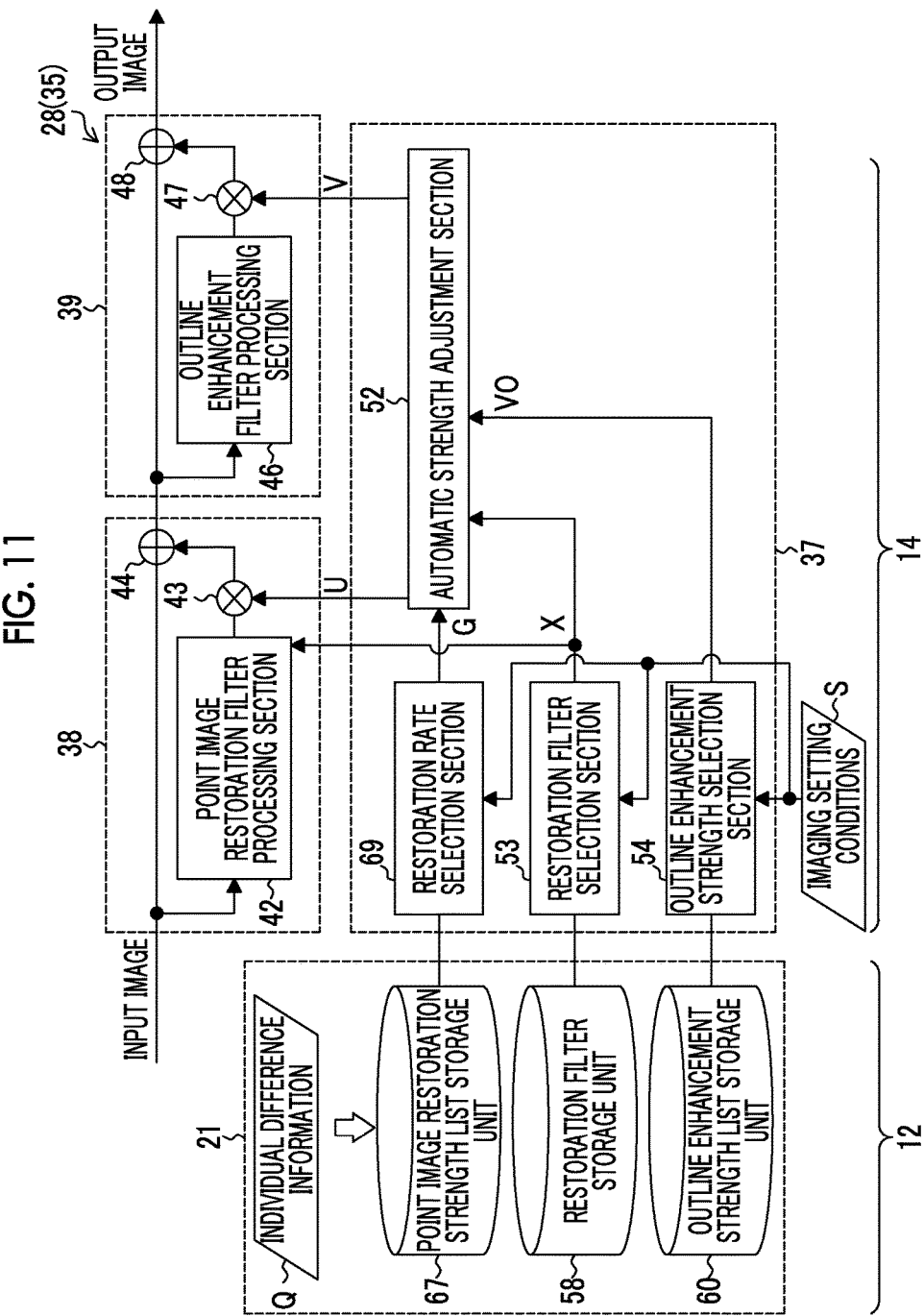
FIG. 11 is a diagram showing the configuration of a processing block that performs point image restoration processing and sharpening processing according to a seventh embodiment.

FIG. 11 is a diagram showing the configuration of a processing block that performs point image restoration processing and sharpening processing according to a seventh embodiment.

In the present embodiment, the same reference numerals are given to the same components as in the first embodiment shown in FIG. 5, and the detailed explanation thereof will be omitted.

In the optical system that forms the lens unit 12, especially in the lens 16 and the like, there are individual differences in the optical characteristics due to or the like. Due to such manufacturing error, the PSF is different for each lens unit 12 strictly speaking. Accordingly, if the point image restoration processing is performed ignoring the individual differences of the lens unit 12 that is an example of the optical system, the degree of restoration may be different even for images captured by using the same type of lens unit 12, and the appearance aspects of artifacts in the restored images may also be different.

Ideally, the point image restoration processing is performed based on the PSF that faithfully reflects the optical characteristics of the lens unit 12, and no artifacts are generated in restored images. In practice, however, due to the individual differences of the lens unit 12, the influence of the PSF in an image to be processed does not match the PSF that forms the basis of the restoration filter used in the point image restoration processing. Accordingly, artifacts may be generated in the restored image. As a method for preventing artifacts caused by individual differences, there is a method of suppressing the degree of restoration by setting the restoration strength magnification U in the point image restoration processing to a small value. However, if the restoration strength magnification U is reduced, the image is not sufficiently restored. Accordingly, desired sharpness cannot be obtained. As a method for preventing such a reduction in the sharpness, adjusting the sharpening strength magnification V for realizing the desired total sharpness in a sequential manner for each lens unit 12 may be considered. However, such sequential adjustment is time-consuming work, which is inconvenient.

In the present embodiment, the restoration strength of the point image restoration processing is adjusted for each lens (optical system), and the determination of the restoration strength magnification U and the sharpening strength magnification V is automated.

That is, in the present embodiment, the lens unit storage unit 21 includes the restoration filter storage unit 58 and the outline enhancement strength list storage unit 60, and further includes a point image restoration strength list storage unit 67. In the point image restoration strength list storage unit 67, the point image restoration rate G unique to the lens unit 12 that is an example of the optical system is stored. The point image restoration rate G is a value reflecting individual differences information Q of the lens unit 12. In addition, the restoration filter X corresponding to the type of the lens unit 12 (optical system) is stored in the restoration filter storage unit 58. The restoration filter X is used in common for the lens unit 12 that is an example of the same type of optical system.

The point image restoration rate G stored in the point image restoration strength list storage unit 67 is read by a restoration rate selection section 69 provided in the sharpness restoration control section 37, and is supplied to the automatic strength adjustment section 52. That is, the restoration rate selection section 69 reads out the point image restoration rate G corresponding to the imaging setting conditions S from the point image restoration strength list storage unit 67, and supplies the point image restoration rate G to the automatic strength adjustment section 52. Similar to the first embodiment described above, the automatic strength adjustment section 52 determines the restoration strength magnification U from the point image restoration rate G that is supplied, and determines the sharpening strength magnification V based on the restoration strength magnification U and the total sharpness evaluation value (total sharpness restoration rate).

Other configurations are the same as those in the first embodiment shown in FIG. 5.

In the present embodiment, since the restoration filter storage unit 58 is provided in the lens unit storage unit 21 (lens unit 12), the restoration filter selection section 53 reads out the restoration filter X from the restoration filter storage unit 58 of the new lens unit 12 if the lens unit 12 is replaced. Therefore, by storing the restoration filter X, which reflects the PSF of the lens unit 12 that is an example of the mounted optical system, in the restoration filter storage unit 58, the restoration filter storage unit 58 that stores the restoration filter X reflecting the PSF of the lens unit 12 is mounted in each lens unit 12. Accordingly, even if a plurality of types of lens units 12 can be mounted in the camera body 14, the restoration filter X optimized for the mounted lens unit 12 can be supplied to the point image restoration filter processing section 42. In addition, according to the present embodiment, since the point image restoration rate G reflecting the individual differences information Q of the lens unit 12 that is an example of the optical system mounted in the camera body 14 is supplied to the automatic strength adjustment section 52, it is possible to prevent artifacts caused by PSF mismatch due to the individual differences of the optical system. In particular, in the present embodiment, the point image restoration rate G reflecting the individual differences information Q is stored in the lens unit storage unit 21 (lens unit 12). Therefore, even if the lens unit 12 mounted in the camera body 14 is replaced, it is possible to determine the restoration strength magnification U and the sharpening strength magnification V according to the point image restoration rate G based on the individual differences information Q of the replaced lens unit 12. Since the restoration strength magnification U and the sharpening strength magnification V that are determined in each filter processing are used, it is possible to obtain the desired total sharpness while performing restoration processing reflecting the individual differences.

In addition, although the point image restoration strength list storage unit 67, the restoration filter storage unit 58, and the outline enhancement strength list storage unit 60 are provided in the lens unit 12 in the embodiment described above, these may be provided in the camera body 14. In a case where these storage units are provided in the camera body 14, it is preferable that data corresponding to the mounted lens unit 12 is downloaded from external devices (the computer 92, the server 97, and the like) to the point image restoration strength list storage unit 67, the restoration filter storage unit 58, and the outline enhancement strength list storage unit 60.

Eighth Embodiment

In the present embodiment, a restoration filter is used in common for a plurality of optical systems.

Figure 12:
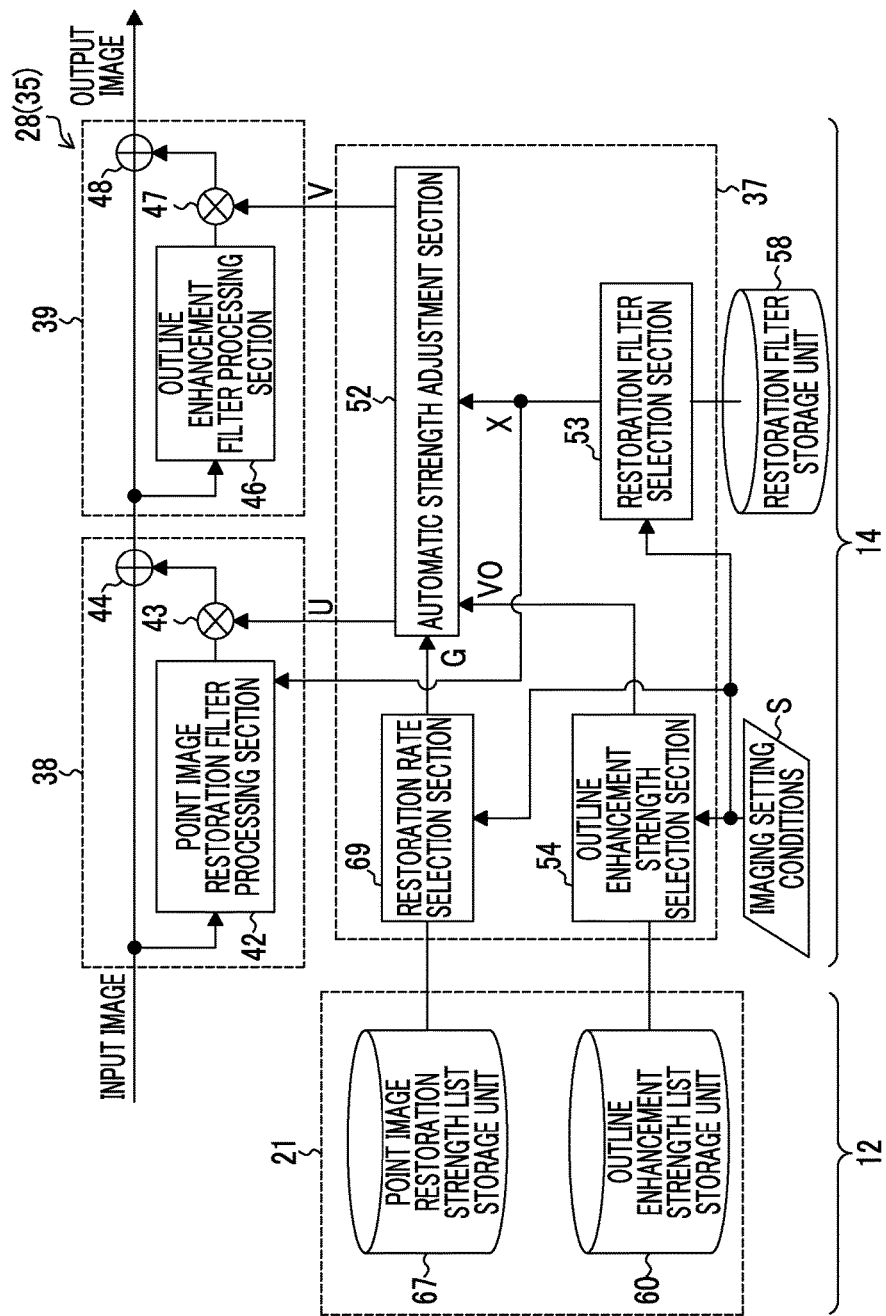
FIG. 12 is a diagram showing the configuration of a processing block that performs point image restoration processing and sharpening processing according to an eighth embodiment.

FIG. 12 is a diagram showing the configuration of a processing block that performs point image restoration processing and sharpening processing according to an eighth embodiment.

In the present embodiment, the same reference numerals are given to the same components as in the seventh embodiment shown in FIG. 11, and the detailed explanation thereof will be omitted.

In the aforementioned seventh embodiment shown in FIG. 11, the restoration filter X is selected for each of the imaging setting conditions and is used in the point image restoration filter processing section 42. In the present embodiment, however, the same restoration filter X is used in the point image restoration filter processing section 42 under a plurality of imaging setting conditions (optical system type and the like).

The processing load in the point image restoration processing using a restoration filter corresponding to the PSF of each of the imaging setting conditions is relatively large. In the present embodiment, however, the load of the point image restoration processing is reduced by setting a predetermined allowable range and sharing the restoration filter X under a plurality of imaging setting conditions within the allowable range. However, if the imaging setting conditions (optical system type and the like) are different, the PSF is also different strictly speaking. In a case where the restoration filter X is shared under a plurality of imaging setting conditions, the appearance aspect of artifacts or the image restoration rate (image recovery rate) in the restored image changes according to the imaging setting conditions.

In the present embodiment, in order to prevent artifacts or the like that are changed according to the optical system type, the point image restoration rate G is set to be relatively weak in the lens unit 12, by which artifacts are likely to appear strongly, by changing the point image restoration rate G of the point image restoration processing according to the type of the lens unit 12 attached to the camera body 14. In order to prevent the phenomenon that a desired total sharpness restoration rate cannot be obtained since the sharpness is varied by setting the point image restoration rate G to be relatively weak, automatic adjustment of the restoration strength magnification U and the sharpening strength magnification V by the automatic strength adjustment section 52 is used.

That is, in the present embodiment shown in FIG. 12, the point image restoration strength list storage unit 67 and the outline enhancement strength list storage unit 60 are provided in the lens unit 12 (lens unit storage unit 21), but the outline enhancement strength selection section 54 is provided in the camera body 14. The restoration filter selection section 53 selects the restoration filter X corresponding to the imaging setting conditions S from the outline enhancement strength selection section 54 regardless of the lens unit 12 mounted in the camera body 14, and supplies the restoration filter X to the point image restoration filter processing section 42 and the automatic strength adjustment section 52.

On the other hand, the point image restoration rate G supplied to the automatic strength adjustment section 52 is determined for each lens unit 12 that is an example of the optical system. That is, the restoration rate selection section 69 reads out the point image restoration rate G corresponding to the imaging setting conditions S from the point image restoration strength list storage unit 67 of the lens unit storage unit 21, and supplies the point image restoration rate G to the automatic strength adjustment section 52.

The list of the point image restoration rate G stored in the point image restoration strength list storage unit 67 and the list of the sharpening strength magnification V0 stored in the outline enhancement strength list storage unit 60 are stored after being calculated in advance for each lens unit 12 that is an example of the optical system.

In the present embodiment, since the common restoration filter X is used by the point image restoration filter processing section 42 regardless of the type of the lens unit 12, the point image restoration rate G and the sharpening strength magnification V0 (sharpening strength magnification V0 in a case where the point image restoration processing is OFF) considering the sharing of the restoration filter X are transmitted to the automatic strength adjustment section 52. Accordingly, the restoration rate selection section 69 may perform arbitrary adjustment processing considering the "sharing of the restoration filter X" for the point image restoration rate G selected from the point image restoration strength list storage unit 67, and supply the point image restoration rate G after the adjustment to the automatic strength adjustment section 52. Similarly, the outline enhancement strength selection section 54 may perform arbitrary adjustment processing considering the "sharing of the restoration filter X" for the sharpening strength magnification V0 selected from the outline enhancement strength list storage unit 60, and supply the sharpening strength magnification V0 after the adjustment to the automatic strength adjustment section 52.

As described above, according to the present embodiment, the point image restoration rate G is determined in advance taking into consideration that the same restoration filter is used for a plurality of imaging setting conditions (optical system type), and the restoration strength magnification U and the sharpening strength magnification V are calculated. Therefore, it is possible to improve the sharpness of an image by the point image restoration processing and the sharpening processing while preventing artifacts in the restored image due to the sharing of the restoration filter.

In the example described above, a restoration filter is used in common for "a plurality of optical systems". However, the imaging setting conditions that are criteria for the sharing of the restoration filter is not limited to the type of the optical system, and the restoration filter may be used in common for other imaging setting conditions (for example, zoom information or the like).

For example, in a case where the same restoration filter is used for a plurality of zoom magnifications (in particular, optical zoom magnification between the optical zoom magnification and the digital zoom magnification), the restoration filter selection section 53 selects an appropriate restoration filter X based on the zoom information included in the imaging setting conditions S, and supplies the selected restoration filter X to the point image restoration filter processing section 42 and the automatic strength adjustment section 52. On the other hand, the restoration rate selection section 69 reads out the point image restoration rate G corresponding to the imaging setting conditions S from the point image restoration strength list storage unit 67, and supplies the point image restoration rate G to the automatic strength adjustment section 52. The automatic strength adjustment section 52 determines the restoration strength magnification U and the sharpening strength magnification V based on the restoration filter X and the point image restoration rate G that are supplied. In this case, the point image restoration rate G or the sharpening strength magnification V0 (maximum outline enhancement strength) taking into consideration that the common restoration filter is used for plurality of zoom magnifications may be supplied to the automatic strength adjustment section 52. For example, the restoration rate selection section 69 and the outline enhancement strength selection section 54 may read out or determine the point image restoration rate G and the sharpening strength magnification V0 (maximum outline enhancement strength) that are based on the use of the common restoration filter.

<Other Modification Examples>

The embodiments described above are just illustrative, and it is also possible to apply the present invention to other configurations.

At least in a case where the "diaphragm value indicates that the diaphragm is more opened than the diaphragm expressed by the first threshold value", the sharpness restoration control section 37 (for example, refer to FIG. 5) can acquire one of the restoration rate and the sharpening rate, and can calculate the other one of the restoration rate and the sharpening rate based on the total sharpness restoration rate. For example, in a case where the diaphragm value is on the open side, automatic adjustment control of the restoration strength magnification U and the sharpening strength magnification V described above may be performed. That is, the sharpness restoration control section 37 (for example, refer to FIG. 5) acquires the diaphragm value (F value) of the optical system (lens unit 12) when acquiring image data, and compares the diaphragm value with the first threshold value. In a case where the diaphragm value is set as an F value, the sharpness restoration control section 37 may acquire one of the restoration rate and the sharpening rate and calculate the other one of the restoration rate and the sharpening rate based on the total sharpness restoration rate only in a case where the acquired F value is equal to or less than the first threshold value (diaphragm open side). In general, the restoration rate of the point image restoration processing and the appearance aspect of artifacts vary depending on the F value. In particular, artifacts are likely to be noticeable in image data captured with the open side F value. Therefore, by performing image processing based on the point image restoration processing and the sharpening processing according to each of the embodiments described above only for the image data captured at the open side diaphragm (rather than the small diaphragm side), it is possible to improve the image sharpness by the sharpening processing while suppressing artifacts that easily appear at the open side diaphragm value. In this case, the image processing based on the point image restoration processing and the sharpening processing according to each of the embodiments described above may be applied at least to the image data captured with the open side F value at which artifacts are likely to be noticeable. However, the image processing based on the point image restoration processing and the sharpening processing according to each of the embodiments described above may be applied to image data captured with other F values, or may be applied only to image data captured with the open side F value.

The diaphragm value (diaphragm information) is included in "imaging setting conditions". In the configuration shown in FIG. 12, since the imaging setting conditions S are supplied to the automatic strength adjustment section 52, "comparison between the diaphragm value and the first threshold value" and "determination of the point image restoration rate G (restoration rate) and the sharpening strength magnification V (sharpening rate)" can be performed in the automatic strength adjustment section 52. The "first threshold value" can be set to an arbitrary value (F value), and may be determined according to other imaging setting conditions, such as a zoom. For example, a threshold value corresponding to the F value in the range of F3.5 to F6.3 may be set to the "first threshold value".

In the embodiments described above, an example is shown in which the sharpening strength magnification V0 (total sharpness restoration rate) in a case where the point image restoration processing is OFF is determined based on the imaging setting conditions S by the outline enhancement strength selection section 54. However, the sharpening strength magnification V0 (total sharpness restoration rate) may be determined based on the designation of the user through the user interface 29.

In addition, in each of the embodiments described above, an example has been described in which the restoration strength magnification U and the sharpening strength magnification V are automatically adjusted and calculated in the digital camera 10. However, the automatic adjustment and calculation may be performed in advance by the manufacturer before shipment, and all parameters of the calculated restoration strength magnification U and the sharpening strength magnification V may be stored in the digital camera 10 (the lens unit storage unit 21, the main body storage unit 31, or the like). For example, the digital camera 10 can store a table in which the "restoration strength magnification U and the sharpening strength magnification V" are matched with the "imaging setting conditions S", and the automatic strength adjustment section 52 can calculate the restoration strength magnification U and the sharpening strength magnification V from the imaging setting conditions S by referring to the table. In this case, a parameter generating method for generating the parameters used in the digital camera 10 (image processing unit) includes a "step of acquiring the total sharpness restoration rate based on the restoration rate of the image data by the point image restoration processing and the sharpening rate of the image data by the sharpening processing" and a "step of acquiring one of the restoration rate and the sharpening rate and calculating the other one of the restoration rate and the sharpening rate based on the total sharpness restoration rate". These steps can be executed in the same manner as in the automatic strength adjustment section 52 according to the first embodiment described above, for example.

Figure 13:
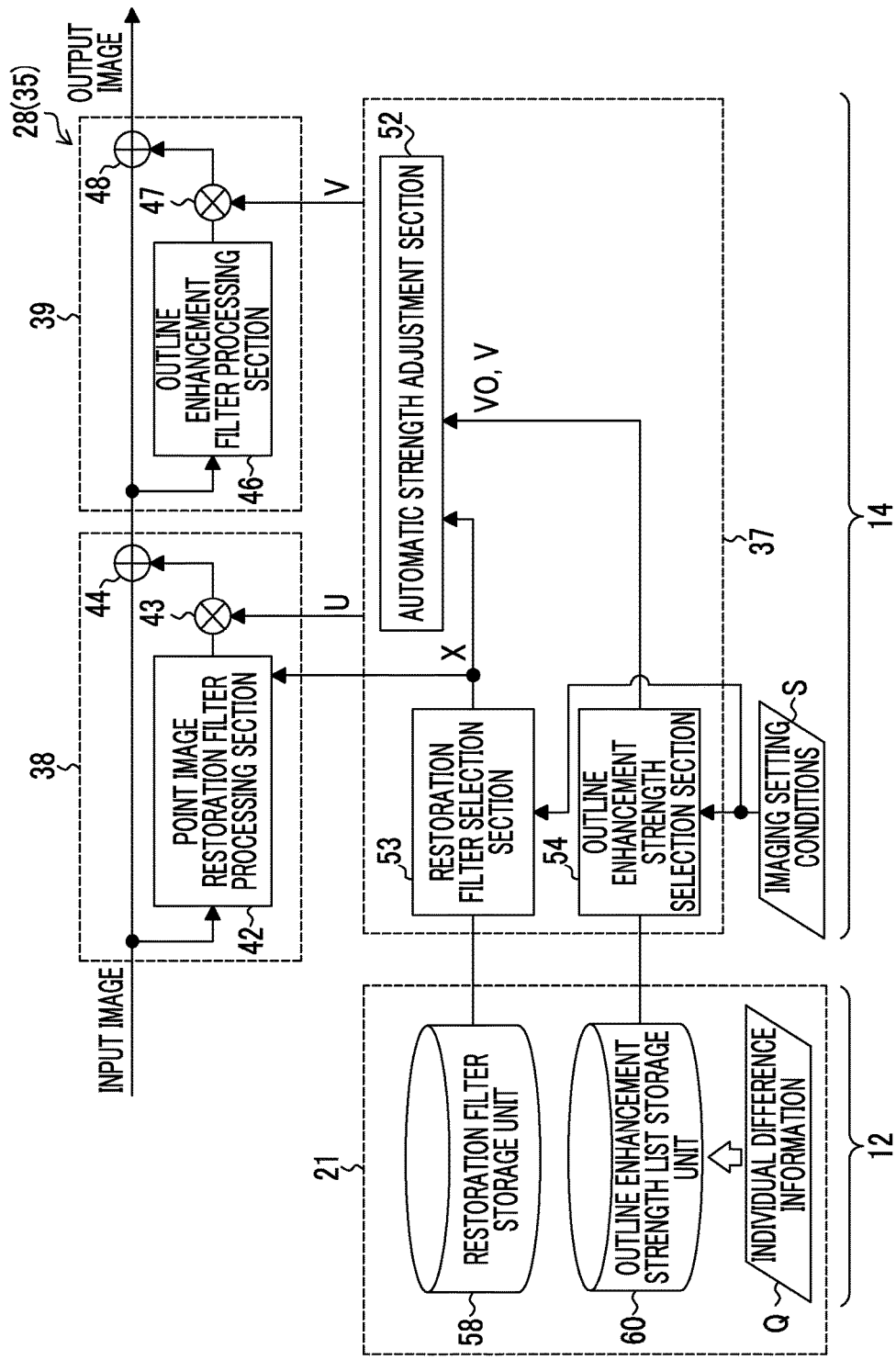
FIG. 13 is a diagram showing the configuration of a processing block that performs point image restoration processing and sharpening processing according to a modification example.

The embodiments described in this specification may be appropriately combined with each other, and arbitrary ones of the first to eighth embodiments and the modification examples may be combined with each other. For example, in the second embodiment (refer to FIG. 6), the outline enhancement strength selection section 54 may acquire the optical characteristics information of the lens unit 12 mounted in the camera body 14, and may determine the sharpening strength magnification V based on the optical characteristics information (lens type information of the optical system, individual differences information of the optical system, imaging setting conditions, and the like). In this case, the outline enhancement strength selection section 54 can acquire the optical characteristics information of the lens unit 12 using any method. For example, the outline enhancement strength selection section 54 (body controller 28) may acquire the optical characteristics information of the lens unit 12 through communication the lens unit controller 20. In addition, as shown in FIG. 13, by storing the sharpening strength magnification V0 and V reflecting the individual differences information Q (an example of optical characteristics information) in the outline enhancement strength list storage unit 60, "acquisition of optical characteristics information" and "determination of the sharpening strength magnification V0 and V based on optical characteristics information" may be simultaneously performed.

In addition, each functional configuration described above can be appropriately realized by any hardware, software, or combination of both hardware and software. For example, the present invention can also be applied to a program causing a computer to execute an image processing method (image processing procedure) in each of the above-described devices and processing units (the body controller 28, the device control unit 34, the image processing unit 35 (the sharpness restoration control section 37, the restoration processing section 38, and the outline enhancement processing section 39), and the like), a computer-readable recording medium (non-transitory recording medium) in which the program is recorded, or a computer in which the program can be installed.

In addition, applicable forms of the present invention are not limited to the digital camera and the computer (server), and the present invention can be applied not only to cameras having an imaging function as a main function but also to mobile devices having an imaging function and other functions (a call function, a communication function, other computer functions) other than the imaging function. As other forms to which the present invention can be applied, for example, a mobile phone or a smartphone having a camera function, a personal digital assistant (PDA), and a portable game machine can be mentioned. Hereinafter, an example of the smartphone to which the present invention can be applied will be described.

<The Configuration of a Smartphone>

Figure 14:
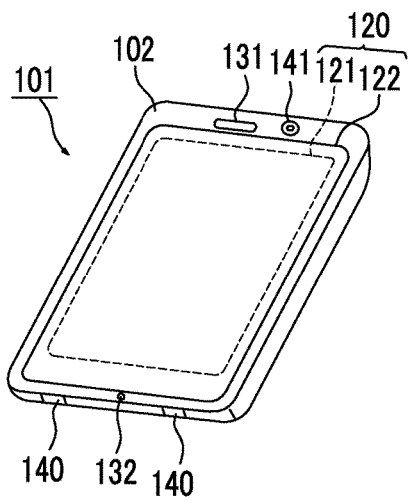
FIG. 14 is a diagram showing the appearance of a smartphone.

FIG. 14 is a diagram showing the appearance of a smartphone 101 that is an embodiment of the imaging apparatus of the present invention. The smartphone 101 shown in FIG. 14 includes a plate-shaped housing 102. On one surface of the housing 102, a display input unit 120 is provided in which a display panel 121 as a display unit and an operation panel 122 as an input unit are integrated. The housing 102 includes a speaker 131, a microphone 132, an operation unit 140, and a camera unit 141. The configuration of the housing 102 is not limited to this. For example, it is possible to adopt a configuration in which a display unit and an input unit are separated from each other, or it is possible to adopt a configuration having a folded structure or a sliding mechanism.

Figure 15:
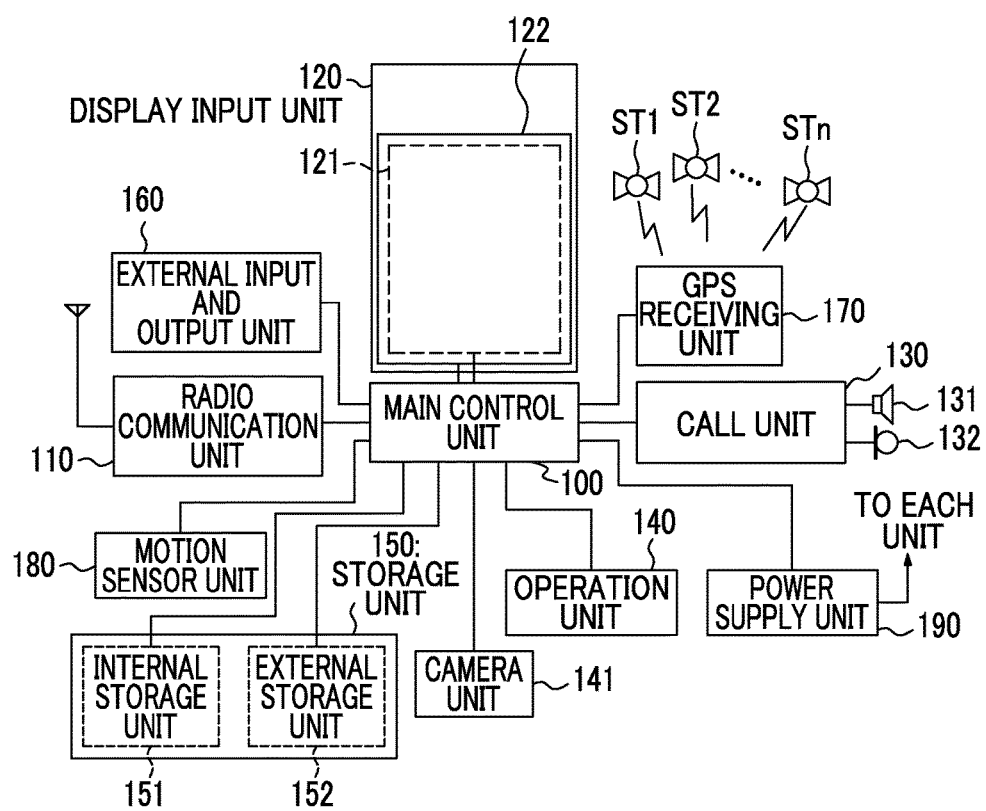
FIG. 15 is a block diagram showing the configuration of the smartphone shown in FIG. 14.

FIG. 15 is a block diagram showing the configuration of the smartphone 101 shown in FIG. 14. As shown in FIG. 15, a radio communication unit 110, the display input unit 120, a call unit 130, the operation unit 140, the camera unit 141, a storage unit 150, an external input and output unit 160, a global positioning system (GPS) receiving unit 170, a motion sensor unit 180, a power supply unit 190, and a main control unit 100 are provided as main components of the smartphone. As a main function, the smartphone 101 has a radio communication function for performing mobile radio communication through a base station BS and a mobile communication network NW.

The radio communication unit 110 performs radio communication with the base station BS accommodated in the mobile communication network NW according to the instruction of the main control unit 100. By using the radio communication, various kinds of file data such as audio data and image data, electronic mail data, and the like are transmitted and received, or Web data, streaming data, and the like are received.

The display input unit 120 is a so-called touch panel that displays images (a still image and a moving image), character information, and the like in order to visually transmit the information to the user and detects a user operation on the displayed information under the control of the main control unit 100, and includes the display panel 121 and the operation panel 122.

In the display panel 121, a liquid crystal display (LCD), an organic electro-luminescence display (OELD), or the like is used as a display device. The operation panel 122 is a device that is placed so that an image displayed on the display surface of the display panel 121 is visible and that detects one or more coordinates operated by a user's finger or a stylus. If the device is operated by a user's finger or a stylus, a detection signal generated due to the operation is output to the main control unit 100. Then, the main control unit 100 detects an operation position (coordinates) on the display panel 121 based on the received detection signal.

As shown in FIG. 14, the display panel 121 and the operation panel 122 of the smartphone 101 illustrated as an embodiment of the imaging apparatus of the present invention are integrated to form the display input unit 120. However, the operation panel 122 is disposed so as to completely cover the display panel 121. In a case where such an arrangement is adopted, the operation panel 122 may have a function of detecting a user operation even in a region outside the display panel 121. In other words, the operation panel 122 may include a detection region of an overlapping portion that overlaps the display panel 121 (hereinafter, referred to as a display region) and a detection region of the other outer edge portion that does not overlap the display panel 121 (hereinafter, referred to as a non-display region).

Although the size of the display region and the size of the display panel 121 may be completely the same, the size of the display region and the size of the display panel 121 may not necessarily be the same. The operation panel 122 may include two sensitive regions of an outer edge portion and the other inner portion. The width of the outer edge portion may be appropriately designed according to the size of the housing 102 or the like. In addition, as a position detection method adopted in the operation panel 122, a matrix switch method, a resistance film method, a surface acoustic wave method, an infrared method, an electromagnetic induction method, an electrostatic capacitance method, and the like can be mentioned, and it is possible to adopt any of the methods.

The call unit 130 includes the speaker 131 or the microphone 132. The call unit 130 can convert the voice of the user, which is input through the microphone 132, into audio data that can be processed by the main control unit 100, and output the audio data to the main control unit 100. Alternatively, the call unit 130 decodes audio data received by the radio communication unit 110 or the external input and output unit 160, and outputs the audio data from the speaker 131. For example, as shown in FIG. 14, the speaker 131 can be mounted on the same surface as a surface on which the display input unit 120 is provided, and the microphone 132 can be mounted on the side surface of the housing 102.

The operation unit 140 is a hardware key using a key switch or the like, and receives an instruction from the user. For example, as shown in FIG. 14, the operation unit 140 is a push button type switch that is mounted on the side surface of the housing 102 of the smartphone 101 and that is turned on when pressed with a finger or the like and is turned off by the restoring force of the spring or the like when the finger is released.

The storage unit 150 stores a control program or control data of the main control unit 100, application software, address data in which the name, telephone number, and the like of the communications partner are associated with each other, transmitted or received e-mail data, Web data downloaded by Web browsing, or downloaded content data, and temporarily stores streaming data or the like. In addition, the storage unit 150 is formed by an internal storage unit 151 built in the smartphone and an external storage unit 152 having a detachable external memory slot. Each of the internal storage unit 151 and the external storage unit 152 that form the storage unit 150 is realized using storage media, such as a flash memory type memory, a hard disk type memory, a multimedia card micro type memory, a card type memory (for example, a MicroSD (registered trademark) memory), a random access memory (RAM), and a read only memory (ROM).

The external input and output unit 160 plays a role of interface with all external devices connected to the smartphone 101, and is directly or indirectly connected to other external devices through communication (for example, a universal serial bus (USB) or IEEE 1394) or a network (for example, the Internet, wireless LAN, Bluetooth (registered trademark), radio frequency identification (RFID), infrared data association (IrDA; registered trademark), Ultra Wideband (UWB; registered trademark), or ZigBee (registered trademark)).

Examples of the external device connected to the smartphone 101 include a wired/wireless headset, a wired/wireless external charger, a wired/wireless data port, a memory card or a subscriber identity module card (SIM)/user identity module card (UIM) card connected through a card socket, an external audio/video device connected through an audio/video input and output (I/O) terminal, an external audio/video device that is wirelessly connected, a smartphone that is connected in a wired/wireless manner, a personal computer that is connected in a wired/wireless manner, a PDA that is connected in a wired/wireless manner, and an earphone. Through the external input and output unit, data received from such an external device may be transmitted to each component inside the smartphone 101, or data inside the smartphone 101 may be transmitted to the external device.

The GPS receiving unit 170 receives GPS signals transmitted from GPS satellites ST1 to STn, performs positioning calculation processing based on the plurality of received GPS signals, and detects a position including the latitude, longitude, and altitude of the smartphone 101, according to the instruction of the main control unit 100. In a case where position information can be acquired from the radio communication unit 110 or the external input and output unit 160 (for example, a wireless LAN), the GPS receiving unit 170 can detect the position using the position information.

The motion sensor unit 180 includes, for example, a three-axis acceleration sensor, and detects the physical movement of the smartphone 101 according to the instruction of the main control unit 100. By detecting the physical movement of the smartphone 101, the movement direction or acceleration of the smartphone 101 is detected. The detection result is output to the main control unit 100.

The power supply unit 190 supplies electric power stored in a battery (not shown) to each unit of the smartphone 101 according to the instruction of the main control unit 100.

The main control unit 100 includes a microprocessor, operates according to the control program or control data stored in the storage unit 150, and performs overall control of the respective units of the smartphone 101. In addition, in order to perform voice communication or data communication through the radio communication unit 110, the main control unit 100 has a mobile communication control function for controlling each unit of the communication system and an application processing function.

The application processing function is realized by the operation of the main control unit 100 according to the application software stored in the storage unit 150. Examples of the application processing function include an infrared communication function for performing data communication with other devices by controlling the external input and output unit 160, an e-mail function for transmission and reception of an e-mail, a Web browsing function for browsing web pages, and the like.

The main control unit 100 has an image processing function of displaying a video on the display input unit 120 based on image data (data of a still image or a moving image), such as received data or downloaded streaming data. The image processing function refers to a function in which the main control unit 100 displays an image on the display input unit 120 by decoding the image data described above and performing image processing on the decoding result.

In addition, the main control unit 100 performs display control of the display panel 121 and operation detection control for detecting a user operation through the operation unit 140 and the operation panel 122.

By the execution of the display control, the main control unit 100 displays an icon for starting application software or a software key, such as a scroll bar, or displays a window for creating an e-mail. The scroll bar refers to a software key for receiving an instruction to move a display portion of, for example, a large image that cannot be fitted in the display region of the display panel 121.

In addition, by the execution of the operation detection control, the main control unit 100 detects a user operation through the operation unit 140, receives an operation on the above-described icon or an input of a character string to the input field of the above-described window through the operation panel 122, or receives a display image scroll request through the scroll bar.

In addition, by the execution of the operation detection control, the main control unit 100 has a touch panel control function for controlling the sensitive region of the operation panel 122 or the display position of a software key by determining whether the operation position of the operation panel 122 is an overlapping portion (display region) that overlaps the display panel 121 or the other outer edge portion (non-display region) that does not overlap the display panel 121.

The main control unit 100 can also detect a gesture operation on the operation panel 122 and execute a function set in advance in response to the detected gesture operation. The gesture operation does not mean a conventional simple touch operation, but means an operation of drawing a trajectory with a finger, an operation of designating a plurality of positions simultaneously, or an operation of drawing a trajectory for at least one of the plurality of positions by combining these.

The camera unit 141 is a digital camera that performs electronic imaging using an imaging element, such as a CMOS. In addition, the camera unit 141 can convert image data obtained by imaging into compressed image data, for example, JPEG image data, and can record the compressed image data in the storage unit 150 or output the compressed image data through the external input and output unit 160 or the radio communication unit 110, under the control of the main control unit 100. In the smartphone 101 shown in FIG. 14, the camera unit 141 is mounted on the same surface as the display input unit 120. However, the mounting position of the camera unit 141 is not limited thereto, and the camera unit 141 may be mounted on the back of the display input unit 120 or a plurality of camera units 141 may be mounted. In a case where a plurality of camera units 141 are mounted, it is possible to perform imaging using only one camera unit 141 provided for the imaging by switching the camera units 141, or it is possible to perform imaging using the plurality of camera units 141 simultaneously.

The camera unit 141 can be used for various functions of the smartphone 101. For example, an image acquired by the camera unit 141 can be displayed on the display panel 121, or an image of the camera unit 141 can be used as one of the operation inputs of the operation panel 122. In addition, when the GPS receiving unit 170 detects a position, it is possible to detect the position with reference to the image from the camera unit 141. By referring to the image from the camera unit 141, it is also possible to determine the direction of the optical axis of the camera unit 141 of the smartphone 101 or to determine the current use environment without using a three-axis acceleration sensor or in combination with the three-axis acceleration sensor. Needless to say, it is also possible to use the image from the camera unit 141 in the application software.

In addition, position information acquired by the GPS receiving unit 170, audio information (may be text information obtained by performing audio/text conversion with the main control unit or the like) acquired by the microphone 132, posture information acquired by the motion sensor unit 180, and the like can be added to the image data of a still image or a motion picture, and the result can be recorded in the storage unit 150 or can be output through the external input and output unit 160 or the radio communication unit 110.

The above image processing unit 35 (the sharpness restoration control section 37, the restoration processing section 38, the outline enhancement processing section 39: refer to FIG. 3) can be realized by the main control unit 100, for example.

EXPLANATION OF REFERENCES

10: digital camera
12: lens unit
14: camera body
16: lens
18: optical system operation unit
20: lens unit controller
21: lens unit storage unit
22: lens unit input and output section
26: imaging element
28: body controller
29: user interface
30: camera body input and output unit 31: main body storage unit
32: input and output interface
33: gamma correction processing unit
34: device control unit
35: image processing unit
37: sharpness restoration control section
38: restoration processing section
39: outline enhancement processing section
42: point image restoration filter processing section
43: restoration multiplier
44: restoration adder
46: outline enhancement filter processing section
47: sharpening multiplier
48: sharpening adder
52: automatic strength adjustment section
53: restoration filter selection section
54: outline enhancement strength selection section
58: restoration filter storage unit
60: outline enhancement strength list storage unit
61: first adder
62: second adder
63: sharpness restoration adjusting section
65: non-linear processing section
67: point image restoration strength list storage unit
69: restoration rate selection section
92: computer
93: computer input and output unit
94: computer controller
95: display
96: Internet
97: server
98: server input and output unit
99: server controller
C: imaging setting conditions
G: point image restoration rate
U: restoration strength magnification
V: sharpening strength magnification
X: restoration filter
M: imaging mode information
Q: individual differences information

What is claimed is:

1. An image processing device, comprising:
a microprocessor configured to:
control image processing of an image data,
control, by using a restoration filter based on a point spread function and by adjusting a restoration rate of the image data, a restoration processing for the image data that is acquired by imaging a subject with an imaging element and an optical system; and
control, by using a sharpening filter and by adjusting a sharpening rate of the image data, a sharpening processing for the image data; and
the microprocessor is further configured to acquire a total sharpness restoration rate based on the restoration rate and the sharpening rate, acquire one of the restoration rate and the sharpening rate, and calculate the other one of the restoration rate and the sharpening rate based on the total sharpness restoration rate.

2. The image processing device according to claim 1, wherein the microprocessor acquires the restoration rate, and calculates the sharpening rate based on the total sharpness restoration rate and the restoration rate.

3. The image processing device according to claim 2, wherein the microprocessor determines the restoration rate based on a designated restoration rate that is designated by a user.

4. The image processing device according to claim 2, wherein the restoration rate is determined based on optical characteristics information indicating characteristics of the optical system.

5. The image processing device according to claim 4, wherein the optical system includes an optical system storage unit that stores the optical characteristics information, and
the restoration rate is determined based on the optical characteristics information stored in the optical system storage unit.

6. The image processing device according to claim 4, wherein the optical characteristics information includes type information of a lens provided in the optical system.

7. The image processing device according to claim 4, wherein the optical characteristics information includes individual differences information of the optical system.

8. The image processing device according to claim 4, wherein the optical characteristics information includes imaging setting conditions.

9. The image processing device according to claim 1, wherein the microprocessor acquires the sharpening rate, and calculates the restoration rate based on the total sharpness restoration rate and the sharpening rate.

10. The image processing device according to claim 9, wherein the microprocessor determines the sharpening rate based on imaging setting conditions in imaging of the image data.

11. The image processing device according to claim 9, wherein the sharpening rate is determined based on optical characteristics information indicating characteristics of the optical system.

12. The image processing device according to claim 11, wherein the optical system includes an optical system storage unit that stores the optical characteristics information, and
the sharpening rate is determined based on the optical characteristics information stored in the optical system storage unit.

13. The image processing device according to claim 1, wherein the microprocessor acquires a diaphragm value of the optical system when acquiring the image data and compares the diaphragm value with a first threshold value, and
at least in a case where the diaphragm value indicates that a diaphragm is more opened than a diaphragm expressed by the first threshold value, the microprocessor acquires one of the restoration rate and the sharpening rate, and calculates the other one of the restoration rate and the sharpening rate based on the total sharpness restoration rate.

14. The image processing device according to claim 1, wherein the microprocessor acquires imaging mode information when acquiring the image data, and maintains the total sharpness restoration rate constant in a case where the imaging mode information indicates a motion picture recording mode.

15. The image processing device according to claim 14, wherein, in a case where the imaging mode information indicates the motion picture recording mode, the microprocessor sets the restoration rate to be smaller than that in a case where the imaging mode information indicates a still image recording mode.

16. The image processing device according to claim 1 wherein the restoration filter is determined based on imaging setting conditions in imaging of the image data.

17. The image processing device according to claim 16, wherein the imaging setting conditions include setting conditions affecting the point spread function.

18. The image processing device according to claim 17, wherein the setting conditions include at least any one of diaphragm information, zoom information, subject distance information, or lens type information of the optical system.

19. The image processing device according to claim 16, wherein the imaging setting conditions include imaging conditions that do not affect the point spread function.

20. The image processing device according to claim 19, wherein the imaging conditions include at least any one of imaging sensitivity information or imaging mode information.

21. The image processing device according to claim 16, further comprising:
a restoration filter storage unit that stores a plurality of the restoration filters based on point spread functions of a plurality of the optical systems; and
a restoration filter selection unit that selects the restoration filter based on the point spread function of the optical system used in imaging of the image data, from the restoration filter storage unit, based on the imaging setting conditions,
wherein the microprocessor performs the restoration processing using the restoration filter selected by the restoration filter selection unit.

22. The image processing device according to claim 1, wherein the restoration filter is used in common for a plurality of optical systems.

23. The image processing device according to claim 1, wherein the restoration filter is used in common for a plurality of imaging setting conditions.

24. The image processing device according to claim 23, wherein the plurality of imaging setting conditions include zoom information of the optical system.

25. The image processing device according to claim 1, wherein the microprocessor adjusts the total sharpness restoration rate to a target sharpness restoration rate at a first frequency.

26. The image processing device according to claim 1, wherein the microprocessor controls so that
the image data is subjected to one of the restoration processing and the sharpening processing.

27. The image processing device according to claim 1, wherein the microprocessor controls so that
the image data is input to the microprocessor for performing the restoration processing and the sharpening processing in parallel and
controls so that increment or decrement data of the image data due to the restoration processing at the microprocessor and increment or decrement data of the image data due to the sharpening processing at the microprocessor are added together.

28. The image processing device according to claim 1, further comprising:
a non-linear processing unit that performs non-linear processing of the image data.

29. The image processing device according to claim 28, wherein the non-linear processing unit is included in at least any one of the microprocessors.

30. The image processing device according to claim 28, wherein the non-linear processing is clipping processing for adjusting a pixel value exceeding a clip threshold value among the pieces of image data to the clip threshold value.

31. The image processing device according to claim 1, wherein the optical system is replaceably attached to an imaging body in which the imaging element is mounted.

32. An imaging apparatus comprising the image processing device according to claim 1.

33. A parameter generating method using the image processing device according to claim 1 for generating a parameter used in a microprocessor that performs controls, by using a restoration filter based on a point spread function and by adjusting a restoration rate of the image data, a restoration processing for image data that is acquired by imaging a subject with an imaging element and an optical system, and controls, by using a sharpening filter and by adjusting a sharpening rate of the image data, a sharpening processing for the image data, the method comprising:
a step of acquiring a total sharpness restoration rate based on the restoration rate of the image data based on the restoration processing and the sharpening rate of the image data based on the sharpening processing; and
a step of acquiring one of the restoration rate and the sharpening rate and calculating the other one of the restoration rate and the sharpening rate based on the total sharpness restoration rate.

34. An image processing method using the image processing device according to claim 1, comprising:
a restoration processing step of performing restoration processing using a restoration filter based on a point spread function for image data acquired from an imaging element by imaging a subject using an optical system;
a sharpening processing step of performing sharpening processing using a sharpening filter for the image data;
a step of acquiring a total sharpness restoration rate based on a restoration rate of the image data based on the restoration processing and a sharpening rate of the image data based on the sharpening processing; and
a step of acquiring one of the restoration rate and the sharpening rate and calculating the other one of the restoration rate and the sharpening rate based on the total sharpness restoration rate.

35. A non-transitory computer readable recording medium storing a program causing a computer to execute:
a procedure of performing restoration processing using a restoration filter based on a point spread function for image data acquired from an imaging element by imaging a subject using an optical system;
a procedure of performing sharpening processing using a sharpening filter for the image data;
a procedure of acquiring a total sharpness restoration rate based on a restoration rate of the image data based on the restoration processing and a sharpening rate of the image data based on the sharpening processing; and
a procedure of acquiring one of the restoration rate and the sharpening rate and calculating the other one of the restoration rate and the sharpening rate based on the total sharpness restoration rate.

* * * * *